United States Patent
Donsomsakunkij et al.

(10) Patent No.: US 11,310,038 B2
(45) Date of Patent: Apr. 19, 2022

(54) SYSTEM AND METHOD FOR SECURING DATA COMMUNICATION BETWEEN COMPUTERS

(71) Applicant: Nitto Denko Corporation, Osaka (JP)

(72) Inventors: Mutita Donsomsakunkij, Bangkok (TH); Disuan Netsirininkul, Bangkok (TH); Suwan Boonprem, Bangkok (TH); Juckrit Youyen, Bangkok (TH); Jugkree Na Ayutthaya Plalakawong, Bangkok (TH)

(73) Assignee: Nitto Denko Corporation

( * ) Notice: Subject to any disclaimer, the term of this patent is extended or adjusted under 35 U.S.C. 154(b) by 93 days.

(21) Appl. No.: 16/977,380

(22) PCT Filed: Feb. 28, 2019

(86) PCT No.: PCT/SG2019/050114
§ 371 (c)(1),
(2) Date: Sep. 1, 2020

(87) PCT Pub. No.: WO2019/168477
PCT Pub. Date: Sep. 6, 2019

(65) Prior Publication Data
US 2021/0058242 A1 Feb. 25, 2021

(30) Foreign Application Priority Data
Mar. 2, 2018 (SG) .......................... 10201801747W

(51) Int. Cl.
*H04L 29/06* (2006.01)
*H04L 9/08* (2006.01)
(Continued)

(52) U.S. Cl.
CPC .......... *H04L 9/0825* (2013.01); *H04L 9/0827* (2013.01); *H04L 9/14* (2013.01); *H04L 9/3213* (2013.01)

(58) Field of Classification Search
None
See application file for complete search history.

(56) References Cited

U.S. PATENT DOCUMENTS

| 8,165,301 B1 | 4/2012 | Bruce et al. | |
|---|---|---|---|
| 2009/0028341 A1* | 1/2009 | Hamachi | H04L 9/083 380/278 |

FOREIGN PATENT DOCUMENTS

| CA | 2313328 A1 * | 7/1999 | .......... H04L 9/3213 |
|---|---|---|---|
| CN | 106506470 A | 3/2017 | |

(Continued)

OTHER PUBLICATIONS

International Search Report for PCT/SG2019/050114 dated May 9, 2019; 3 pages.
(Continued)

*Primary Examiner* — Andrew J Steinle
(74) *Attorney, Agent, or Firm* — Lerner, David, Littenberg, Krumholz & Mentlik, LLP

(57) ABSTRACT

An aspect of the present disclosure generally relates to a computer system (100) and method (200) for securing data communication between a first computer (110) and a second computer (120). The method (200) comprises: cooperatively executing (202), by the first computer (110) and the second computer (120), a first data communication instruction for communicating first data from the first computer (110) to the second computer (120); generating (204) a first session key by the first computer (110); encrypting (206), by the first computer (110) the first data using the first session key; encrypting (208), by the first computer (110) the first session key using a first public key, the first public key paired with
(Continued)

a first private key which are generated for the second computer (120); sending (210) the encrypted first data and first session key from the first computer (110) to the second computer (120); decrypting (212), by the second computer (120), the encrypted first session key using the first private key; decrypting (214), by the second computer (120) the encrypted first data using the decrypted first session key; and processing (216), by the second computer (120), the decrypted first data based on the first data communication instruction.

20 Claims, 22 Drawing Sheets

(51) Int. Cl.
*H04L 9/14* (2006.01)
*H04L 9/32* (2006.01)

(56) References Cited

FOREIGN PATENT DOCUMENTS

| | | | | |
|---|---|---|---|---|
| EP | 1480102 A2 | * | 11/2004 | ............ G07F 17/323 |
| WO | 0195554 A1 | | 12/2001 | |

OTHER PUBLICATIONS

Search Report for European Application No. 19761196.5 dated Sep. 23, 2021. 2 pgs.

Anonymous: "PKGS 12—Wikipedia", Feb. 4, 2018 (Feb. 4, 2018), XP055843868, Retrieved from the Internet: URL: https://en.wikipedia.org/w/index.php?title=PKCS_12&oldid=824020550 [retrieved on Sep. 22, 2021].

Anonymous: "Public-key cryptography—Wikipedia", Sep. 22, 2021 (Sep. 22, 2021), XP055843619, Retrieved from the Internet: URL:https://en.wikipedia.org/wiki/Public-key_cryptography [retrieved on Sep. 22, 2021].

Anonymous: "How SSL Works", Mar. 9, 2016 (Mar. 9, 2016), XP055843341, Retrieved from the Internet: URL:https://web.archive.org/web/20160309003249/https://publib.boulder.IBM.com/tividd/td/TRM/GC32-1323-00/en_US/HTML/admin231.htm [retrieved on Sep. 21, 2021].

Anonymous: "All about SSL Cryptography DigiCert.com", Sep. 21, 2021 (Sep. 21, 2021), XP055843356, Retrieved from the Internet: URL:https://www.digicert.com/faq/ssl-cryptography.htm [retrieved on Sep. 21, 2021].

Anonymous: "How to Use OpenSSL with a Windows Certificate Authority to Generate XenServer Certificates", Feb. 21, 2015 (Feb. 21, 2015), XP055843860, Retrieved from the Internet: URL:https://web.archive.org/web/20150221140241/http://support.citrix.com/article/CTX128656/ [retrieved on Sep. 22, 2021].

* cited by examiner

{
 "access_token": "102a050e98fbb385d8122cb976317779",
 "expires_in": 7200,
 "private_key": "MIIBOgIBAAJBALHhbwe8oENEj7UcUoj33PSqhNZP2fSF2IR/LtYbQU7AuOaknjgZtxeIhc4cw2BjJpHPZIeWO
NtHavqQD
/4gKGMPr2SKWsCAwEAAQJAVR1YomwYh3eECBZQS+fGW3Btcb/pu75b1zKAN8T83/A9ffOCbW7xZh0nXtwacWuNMExIl1+TqCv2NEMsSyxsQIthA
/H0xzkpnGgeqzM3fjZL1/2A3vrKEaZP+qdNpAiEAz6tAAPUyYHaQgVRyLIhXwvMcmW2jf2Sw/imJYmxYv7MCIQCY9q/8zAQjf+J90LYnt8UrfDnR
/MRWNdDQkmfn8k1biQigHvlf+YSQWzuP0RXqZaRzn4Nm0z467PLuRRGffWEz4GOCIGhtZ9Z2LBEtHA3pDopTc49vMGzx5WbzxZciuDD2MtYQ",
 "public_key":
 "MFwwDQYJKoZIhvcNAQEBBQADSwAwSAJBAMINQisMQe86PdgY3YDptoyRIR3G0ysQIVv6nQtuXvbjeDX4ozi15Hn55U3Lzzuji1hgU98Vu9xZEeD
4ab
 JPcYcCAwEAAQ==",
 "refresh_token": "916cc4cc449d410e23829f728fe6bc31",
 "token_type": "Bearer"
}

Figure 9A

{
 "data":
 "042BrDaciB81529urf3Rf40O1Lugb9a1EXe1SLX3CUFvthX5xOJ3GfaGH/4S2w7Fh04S9Klt8givOi9aDNFtGy/dUDHCWse47QHldh92Tp1isTaYfC5t
p6FvBElyAFzSgcuYWKT8tNz2ijhPTSSxL/Yy+SsyRHoIgiE/00MHkfhHuhjKnmYYX2V5ZdGKYPsepM7
/AGliRuep4y77eldNiYinGJFhQhEdzyxFcYrTDu7Tljit9QD22pMekrhb59HTNTb5uzFv7Lws86BquopWdtX8r+9vD2iGU/1oidbhzY+Qtq/dlMj/doDKbb4s
go8wJz9hwwqqGnCCTPzYjXctoqxBgOCZs/EYpShxx4DCNOitb2mAt06+jcjPWxy/eevm2vX
+/G94aVh5BkuXvsdrwzOSYVeUhqxeYHrKnEQV29XE3zbMeyPjYwYOO2+Q5HAfGUxXUwcSt6pxccRNvOXyKat
jl37u0Bb4INqUEwty9aNstmCeWk+wYiRN0/reaCBMxkqch2h9DxBdPXosoQPHykX9oyB0Z/0XNknpDnCcQ=",
 "key": "o2iT8MWXZwudtH9fTur8u7QYSxdTh9ICHxC+S/1RV9MGbApJ4zi6NTQ/5WmMbnpnNCOUdvBJ9fCuRP+MMR9zQ=="
}

Figure 9B

```
{
"data": {"client": {"application_name": "Theta Zen App", "Client_id": "ThetaApp", "client_secret":
"cb014dcbd3d84f0001572e402577168", "company_name": "Zensorium", "status": ""}, "page": "Grant",
"permissions": [{"scope_description": "Allow Heart Rate", "scope_id": "heartrate", "scope_label": "",
"assets/no_photo_png"}, {"scope_description": "Allow activity and exercise"
,"activity", "scope_label": "", "scope_picture": "/assets/no_photo.png"},{"scope_description": "Allow sleep",
"scope_id": "sleep", "scope_label": "", "scope_picture": "/assets/no_photo
_png"}, {"scope_description": "Allow stress", "scope_id": "stress", "scope_label" : "", "scope_picture": "/assets/no_photo.png"}],
"session_code":
"prtW3zSTxkzSeL92mfpC0hNKcgoJJ_pt3Iz9A8rw_ZrTTt9e2uakrRyspR7Hvl33q29itdXwYHPiHbVQX9tudRFMkIncAmAsqCK-
VCFnziiuFqP4WFyZgbTInFIBahN8fmzcX4ebc=",
}
```

Figure 9C

```
{
"date_expired": "2018-01-18T05:51:16",
"otk_id": "3xWZdVxeEs5xUmRsuPGlPca5ax07Pl8s",
"private_key": "MIIBOwIBAAJBANBqcRYLQ03my94KfmBM0XoF9yvEFZGZG6togWCA024gfLr07ELAjOrczfCGwYGweDC
/pkD8Y3RiZMm0Pdj8VsvECAwEAAQJBALLhyTl8dYWhACOTS3mgR0UpbNg14piOBOhU0JBW/OWExnePw4A7HY01fnoRrU7ttvssGIaP
+LIGN6VOCpY8EkCIQDcv4s09RJc1mPON8F8QIJEdtryRTu5U78zLy1tQ5zHLcwihAPGyu9zBoPGUT22fFZ5Rt
+46rptJxrAUnzm6qc1WrQvcLAiEA2Wx35OWRjotDhov4MRB8uG2SUXTy3gnIJzdG2+q7au8CIAs617mxEW5iCsy4GIQLnfUmqtfpv
+iZaSEBMGypkWnzAiAo2JBCreygelNHQueZiQUWT8uxJTFVXMDsOmZu63NbA==",
"public_key": "MFwwDQYJKoZIhvcNAQEBBQADSwAwSAJBAKYTuC3Zz1pK4kBX4MIVN2B9kkQx5rs34x5Q3UyevA2YUu3GVguz
+l7mPoH5typ1w3SG1lhB8gzp1gi+ELAXb7MCAwEAAQ==",
}
```

Figure 9D

SYSTEM AND METHOD FOR SECURING DATA COMMUNICATION BETWEEN COMPUTERS

CROSS REFERENCE TO RELATED APPLICATIONS

This application is a national phase entry under 35 U.S.C. § 371 of International Application No. PCT/SG2019/050114, filed Feb. 28, 2019, which claims the benefit of Singapore Patent Application No. 10201801747W filed on Mar. 2, 2018, the disclosures of which are incorporated herein by reference.

TECHNICAL FIELD

The present disclosure generally relates to a system and method for securing data communication between computers. More particularly, the present disclosure describes various embodiments of a system and a method for securing data communication between a local client computer and a remote computer server, e.g. a cloud-based server or platform, using various security keys for encryption and decryption.

BACKGROUND

In many instances, data communication between computers are not encrypted and this could present security risks, such as man-in-the-middle attacks, especially if the data communication contains confidential/sensitive information. In this modern environment, it is common for users, including individuals and businesses, to use cloud-based platforms for various purposes such as data storage or information sharing. Various cloud computing platforms have emerged to meet the growing demands for cloud computing services.

Cloud computing services can be broadly divided to high-level and low-level services. The high-level services usually cater to businesses or organizations. There are usually limitations for customization for end-user applications and the high-level services do not allow direct interaction or access with the low-level services. The low-level services usually cater to raw data extracted directly from another source.

Businesses usually have computer systems to perform various functions including the storage, access, and processing of confidential/proprietary information. The confidential information may include medical or personal information. Several governmental policies and regulations are put in place to protect the medical information for prevention of fraud usage, such as the Health Insurance Portability and Accountability Act (HIPAA) in the United States and the General Data Protection Regulation (GDPR) in Europe. These regulations impose certain security requirements on medical information provided to third parties sources.

Businesses are increasingly using cloud computing services as they evolve beyond traditional business environments. Some businesses may need to work with other parties who may want to gain access to sensitive information such as medical and/or personal data. While some parties may have legitimate intentions, such as to use the information for insurance policies, there may be parties who are distrustful or even have malicious intent. These parties may attempt to gain access to the sensitive information during communication of the information via the cloud computing service. It is thus necessary for some encryption of the data/information before communication or distribution to other parties for protection.

Protection of confidential/sensitive information such as medical information, measurement or raw data based on vital signs, personal data, and other forms of sensitive information is important as such confidential/sensitive information are potentially subject to unauthorized access by unknown users. Techniques such as key-based cryptography processes may be used for securing data communicated using cloud computing services to meet user demands. However, these cryptography approaches often do not satisfy the necessary protection since when the encrypted data gets decrypted commonly at the point the data is read, it is still possible to transmit encrypted data and have an unknown receiver decrypt it.

U.S. Pat. No. 9,166,782 describes a method of encrypting communication between a source computer and a destination computer. However, this method involves a third-party key storage server to provide security keys to the computers. Moreover, the computers are required to deposit their private keys to the key storage server in order to achieve encrypted communication between the computers. This method is seemingly complex as every communication to be encrypted requires action between the key storage server and both the source and destination computers.

Therefore, in order to address or alleviate at least one of the aforementioned problems and/or disadvantages, there is a need to provide an improved system and method for securing data communication between computers.

SUMMARY

According to an aspect of the present disclosure, there is a computer system, a method, and non-transitory computer-readable storage medium comprising instructions for securing data communication between a first computer and a second computer. The system comprises the first computer and the second computer communicatively connected to each other. The first and second computers are configured for performing the method. The method comprises: cooperatively executing, by the first and second computers, a first data communication instruction for communicating first data from the first computer to the second computer; generating a first session key by the first computer; encrypting, by the first computer, the first data using the first session key; encrypting, by the first computer, the first session key using a first public key, the first public key paired with a first private key, the first public-private key pair generated for the second computer; sending the encrypted first data and the encrypted first session key from the first computer to the second computer; decrypting, by the second computer, the encrypted first session key using the first private key; decrypting, by the second computer, the encrypted first data using the decrypted first session key; and processing, by the second computer, the decrypted first data based on the first data communication instruction.

A system and method for securing data communication between computers according to the present disclosure are thus disclosed herein. Various features, aspects, and advantages of the present disclosure will become more apparent from the following detailed description of the embodiments of the present disclosure, by way of non-limiting examples only, along with the accompanying drawings.

BRIEF DESCRIPTION OF THE DRAWINGS

FIG. 9A is an illustration of a response from the token generation process communicated to the local client computer.

FIG. 9B and FIG. 9C are illustrations of encrypted and decrypted data communicated from the local client computer to the remote computer server.

FIG. 9D is an illustration of a single-use client private key and a single-use server public key.

DETAILED DESCRIPTION

Figure 1A:
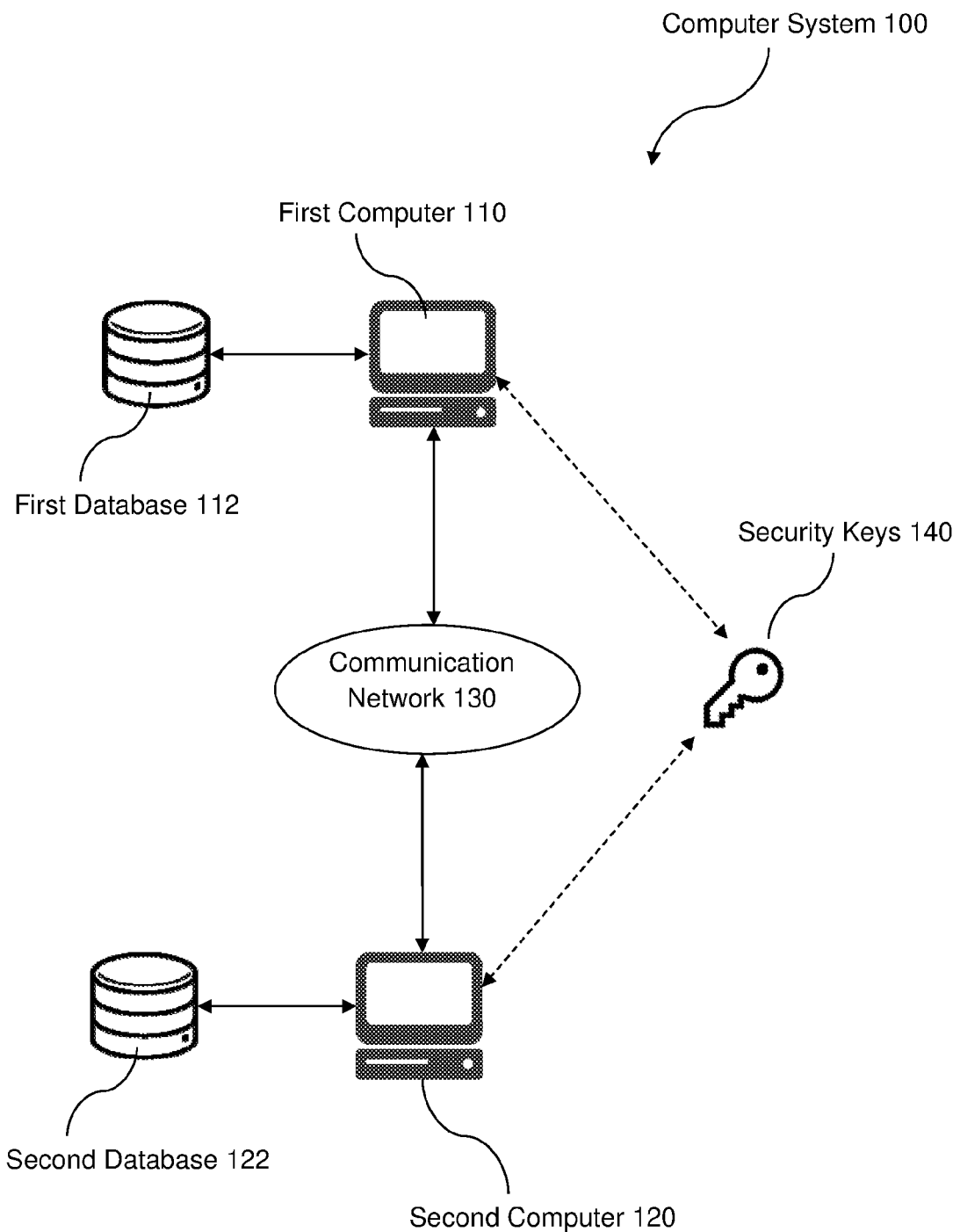
FIG. 1A is a schematic illustration of a computer system for securing data communication between a first computer and a second computer.

For purposes of brevity and clarity, descriptions of embodiments of the present disclosure are directed to a system and method for securing data communication between computers, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, well-known systems, methods, procedures, and components have not been described in detail so as to not unnecessarily obscure aspects of the embodiments of the present disclosure.

In embodiments of the present disclosure, depiction of a given element or consideration or use of a particular element number in a particular figure or a reference thereto in corresponding descriptive material can encompass the same, an equivalent, or an analogous element or element number identified in another figure or descriptive material associated therewith.

References to "an embodiment/example", "another embodiment/example", "some embodiments/examples", "some other embodiments/examples", and so on, indicate that the embodiment(s)/example(s) so described may include a particular feature, structure, characteristic, property, element, or limitation, but that not every embodiment/example necessarily includes that particular feature, structure, characteristic, property, element or limitation. Furthermore, repeated use of the phrase "in an embodiment/example" or "in another embodiment I example" does not necessarily refer to the same embodiment/example.

The terms "comprising", "including", "having", and the like do not exclude the presence of other features/elements/steps than those listed in an embodiment. Recitation of certain features/elements/steps in mutually different embodiments does not indicate that a combination of these features/elements/steps cannot be used in an embodiment.

As used herein, the terms "a" and "an" are defined as one or more than one. The use of "/" in a figure or associated text is understood to mean "and/or" unless otherwise indicated. The term "set" is defined as a non-empty finite organization of elements that mathematically exhibits a cardinality of at least one (e.g. a set as defined herein can correspond to a unit, singlet, or single-element set, or a multiple-element set), in accordance with known mathematical definitions.

As used herein, the terms "component", "module," "system", "interface", and the like are generally intended to refer to a computer-related entity, either hardware, a combination of hardware and software, software, or software in execution. For example, a component or a module may be, but is not limited to being, a process running on a processor, a processor, an object, an executable, a thread of execution, a program, and/or a computer. By way of illustration, both an application running on a controller and the controller can be a component/module. One or more components/modules may reside within a process and/or thread of execution. A component/module may be localized on one computer and/or distributed among a plurality of computers.

In representative or exemplary embodiments of the present disclosure, there is a computer system 100 comprising a first computer 110 and a second computer 120 communicatively connected to each other via a communication network 130, as illustrated in FIG. 1A. The computer system 100 is configured for securing data communication between the first computer 110 and the second computer 120 by using security keys 140 for encryption and decryption. The first computer 110 and the second computer 120 are configured for cooperatively executing data communication instructions including using the security keys 140 to encrypt and decrypt data communicated between the first computer 110 and the second computer 120 via the communication network 130.

Each of the first computer 110 and the second computer 120 comprises or is communicatively connected to a first database 112 and a second database 122, respectively, for storing data. The databases 112 and 122 may reside locally on the first computer 110 and second computer 120 respectively, or alternatively on respective remote or cloud server communicatively linked to the first computer 110 and second computer 120. The databases 112 and 122 may have flash storage memories, hard drives, temporary storage locations, etc. for storing the data. Additionally, the databases 112 and 122 may be implemented with various security measures to secure and protect the data stored thereon, as will be readily understood by the skilled person.

The communication network 130 is a medium or environment through which content, notifications, and/or messages are communicated among various entities, including the first computer 110 and the second computer 120. Some non-limiting examples of the communication network 130 include a virtual private network (VPN), wireless fidelity (Wi-Fi) network, light fidelity (Li-Fi) network, local area network (LAN), wide area network (WAN), metropolitan area network (MAN), satellite network, Internet, fiber optic network, coaxial cable network, infrared (IR) network, radio frequency (RF) network, and any combination thereof. Connection to the communication network 130 may be in accordance with various wired and wireless communication protocols, such as Transmission Control Protocol/Internet Protocol (TCP/IP), User Datagram Protocol (UDP), 2nd to 5th Generation (2G to 5G), Long Term Evolution (LTE), Long Range (LoRa), and any combination thereof. Each of the first computer 110 and the second computer 120 comprises a data communication or transceiver module to communicate and send/receive data over the communication network 130. Some non-limiting examples of a transceiver module include an antenna module, a radio frequency transceiver module, a wireless transceiver module, a Bluetooth transceiver module, an Ethernet port, a Universal Serial Bus (USB) port, or any combination thereof.

The security keys 140 used in the computer system 100 for encryption and decryption may be classified into symmetric and asymmetric keys. Symmetric keys are used for symmetric cryptography which is executed by only one symmetric key possessed by both parties. The symmetric key is applied to encrypt and decrypt data. Asymmetric keys are pairs of keys for asymmetric cryptography or public key cryptography. Each pair of asymmetric keys consist of a public key and a private key. The public key of a user is made available to any other user who wants to communicate confidential/sensitive data to the user and who wants to encrypt the data to be communicated. Data that is encrypted using a public key can only be decrypted using a private key in the same public-private key pair. Each of the encryption/decryption/symmetric/asymmetric keys may be a number, a word, alphanumeric string, or a string of random characters.

The symmetric keys such as session keys are generated using a symmetric encryption algorithm such as Advanced Encryption Standard (AES), Twofish, Serpent, Blowfish, Rivest Cipher 4 (RC4), Data Encryption Standard (DES), and Triple DES (3DES), and the like and any combination thereof. The asymmetric public-private key pairs are generated using an asymmetric encryption algorithm such as the Rivest-Shamir-Adleman (RSA) algorithm, Diffie-Hellman Key Exchange method, Elliptic-Curve Cryptography (ECC) approach, ElGamal algorithm, and Digital Signature Algorithm (DSA), and the like and any combination thereof. It will be understood by the skilled person that there may be other algorithms, methods, or approaches to generating the symmetric and asymmetric keys. Additionally, each asymmetric key pair is certified by a trusted security organization and has a digital certificate associated with the key pair. A digital certificate contains information such as the name of the trusted organization or certificate authority (CA) that issued the digital certificate, identification details of the user for whom the asymmetric key pair is generated for, and the user's public key in the same key pair. The digital certificate is commonly issued according to the X.509 standard for public key certificates in cryptography. X.509 certificates are used in many Internet protocols, including Transport Layer Security (TLS)/Secure Sockets Layer (SSL), which is the basis for Hyper Text Transfer Protocol Secure (HTTPS), the secure protocol for accessing the Internet.

Figure 2A:
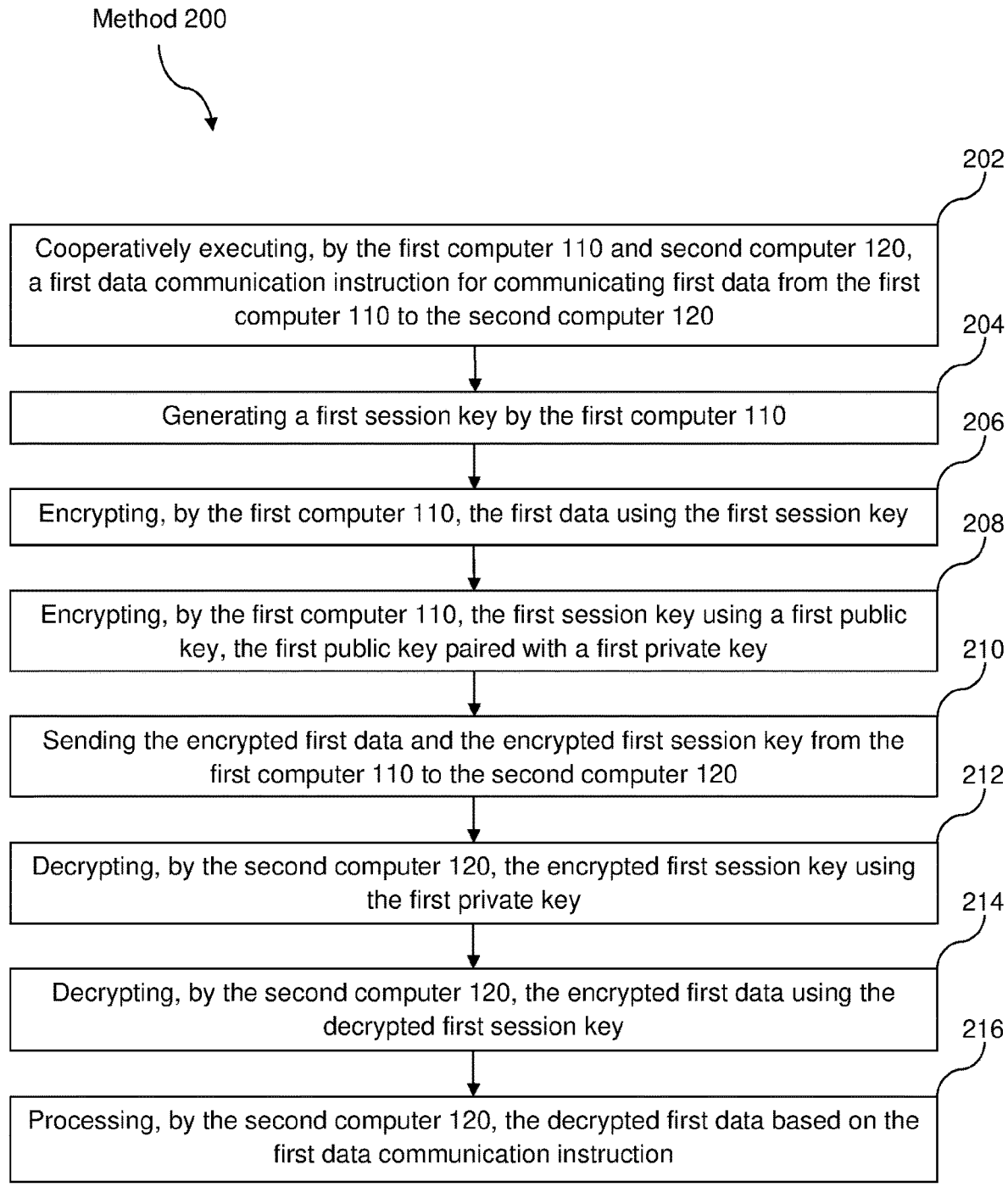
FIG. 2A is a flowchart illustration of a method for securing data communication between the first and second computers, specifically for communicating data from the first computer to the second computer.

With reference to FIG. 2A, there is shown a method 200 for securing data communication between the first computer 110 and the second computer 120. The method 200 is implemented on and performed by the first computer 110 and the second computer 120, each of which comprises various modules/components for performing various operations or steps of the method 200. The method 200 comprises a step 202 of cooperatively executing, by the first computer 110 and the second computer 120, a first data communication instruction for communicating first data from the first computer 110 to the second computer 120.

The method 200 further comprises a step 204 of generating a first session key by the first computer 110. The first session key is a symmetric key used for both encryption and decryption. The method 200 further comprises a step 206 of encrypting, by the first computer 110, the first data using the first session key, wherein the first data comprises data/information to be communicated from the first computer 110 to the second computer 120. The method 200 further comprises a step 208 of encrypting, by the first computer 110, the first session key using a first public key, the first public key paired with a first private key. The first public-private key pair is an asymmetric key pair that is generated for the second computer 120.

The method 200 further comprises a step 210 of sending the encrypted first data and the encrypted first session key from the first computer 110 to the second computer 120. The method 200 further comprises a step 212 of decrypting, by the second computer 120, the encrypted first session key using the first private key, since the first session key was encrypted using the first public key of the same first asymmetric public-private key pair. The method 200 further comprises a step 214 of decrypting, by the second computer 120, the encrypted first data using the decrypted first session key. The method 200 further comprises a step 216 of processing, by the second computer 120, the decrypted first data based on the first data communication instruction. For example, the second computer 120 stores the decrypted first data on the second database 122 thereof for secure data storage and subsequent retrieval by the first computer 110 or other computers with permission to access the first data. Permission to access the first data may be given by a user or an administrator of the first computer 110 to other composters, such as if the user wants the users of the other computers to share access to the first data, since the first data originated from the first computer 110. In some situations, a user or an administrator of the second computer 120 may grant permissions to the other users, such as if certain parties are requesting access to the first data.

In some embodiments, the first public-private key pair has an expiry condition, such that the first public-private key pair is valid for encryption and decryption before the expiry condition is met. In one example, the expiry condition is a predefined valid period, e.g. a period starting from generation of the first public-private key pair, or a predefined expiry date and time. The first public-private key pair automatically expires after the predefined valid period or predefined expiry date and time, and would not be valid for encryption and decryption outside of the predefined valid period or after the predefined expiry date and time. The predefined valid period is at least two hours but may be configurable or defined by the first computer 110 and/or the second computer 120, such as to change it to any number of hours, minutes, days, etc. In another example, the expiry condition is a predefined number of uses of the first public-private key pair which automatically expires after the predefined number of uses. The predefined number of uses may be configurable or defined by the first computer 110 and/or the second computer 120. The first public-private key pair may be configured for single-use or one-time use only, i.e. the first public-private key pair automatically expires after the single-use. The expiry condition may be a combination of any one or more of the above conditions. For example, the predefined number of uses of the first public-private key pair is only valid during the predefined valid period.

Figure 2B:
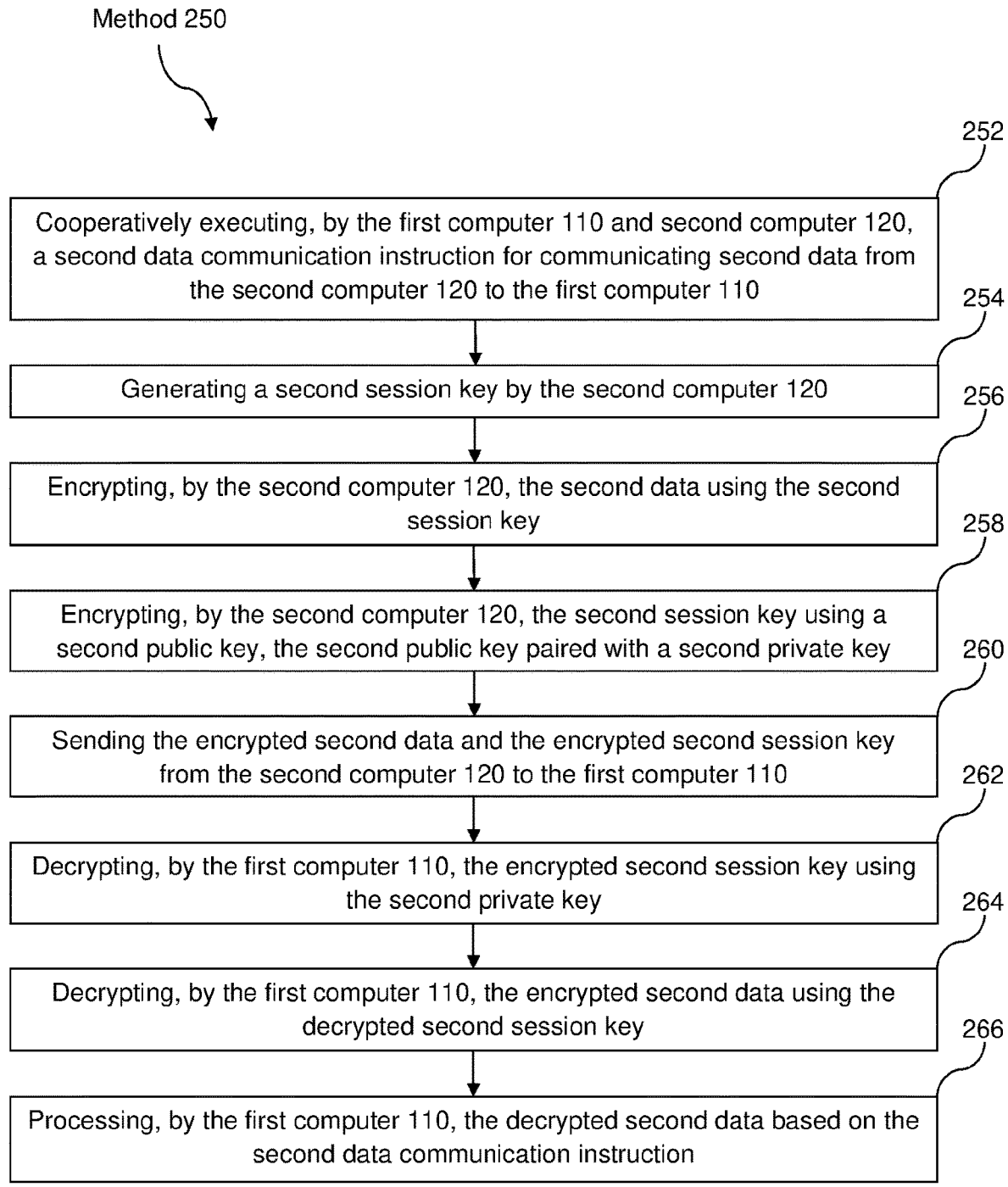
FIG. 2B is a flowchart illustration of a method for securing data communication between the first and second computers, specifically for communicating data from the second computer to the first computer.

The method 200 described above relate to securing data communication from the first computer 110 to the second computer 120, such as for storing of the first data on the second computer 120. In some embodiments, there is data exchange between the first computer 110 and the second computer 120. Specifically, the second computer 120 may return encrypted data to the first computer 110 via a method 250 as shown in FIG. 2B. The method 200 further comprises performing the method 250. It will be appreciated that various aspects of the method 200 apply similarly or analogously to the method 250 and vice versa, and such aspects are omitted from the description of the method 250 for purpose of brevity.

With reference to FIG. 2B, the method 250 comprises a step 252 of cooperatively executing, by the first computer 110 and the second computer 120, a second data communication instruction for communicating second data from the second computer 120 to the first computer 110, such as for a request by the first computer 110 for retrieving the second data from the second computer 120.

The method 250 further comprises a step 254 of generating a second session key by the second computer 120. The second session key is a symmetric key used for both encryption and decryption. The method 250 further comprises a step 256 of encrypting, by the second computer 120, the second data using the second session key, wherein the second data comprises data/information to be communicated from the second computer 120 to the first computer 110. The method 250 further comprises a step 258 of encrypting, by the second computer 120, the second session key using a second public key, the second public key paired with a second private key. The second public-private key pair is an asymmetric key pair that is generated for the first computer 110.

The method 250 further comprises a step 260 of sending the encrypted second data and the encrypted second session key from the second computer 120 to the first computer 110. The method 250 further comprises a step 262 of decrypting, by the first computer 110, the encrypted second session key using the second private key. The method 250 further comprises a step 264 of decrypting, by the first computer 110, the encrypted second data using the decrypted second session key. The method 250 further comprises a step 266 of processing, by the first computer 110, the decrypted second data based on the second data communication instruction. For example, the first computer 110 extracts the decrypted second data in response to said decryption thereof and stores the decrypted second data on the first database 112 thereof.

In some embodiments and like the first public-private key pair, the second public-private key pair has an expiry condition, such that the second public-private key pair is valid for encryption and decryption before the expiry condition is met. It will be appreciated that the expiry condition of the first public-private key pair described above applies similarly or analogously to the second public-private key pair.

The methods 200 and 250 described above relate to secure data communication between the first computer 110 and the second computer 120 by using the relevant first session key, second session key, first public-private key pair, and second public-private key pair generated for the first computer 110 and the second computer 120. Particularly, the first public-private key pair and the second public-private key pair are generated for the second computer 120 and the first computer 110, respectively. However, it will be appreciated that said secure data communication may use a first public-private key pair generated for the first computer 110 and a second public-private key pair generated for the second computer 120.

Figure 3A:
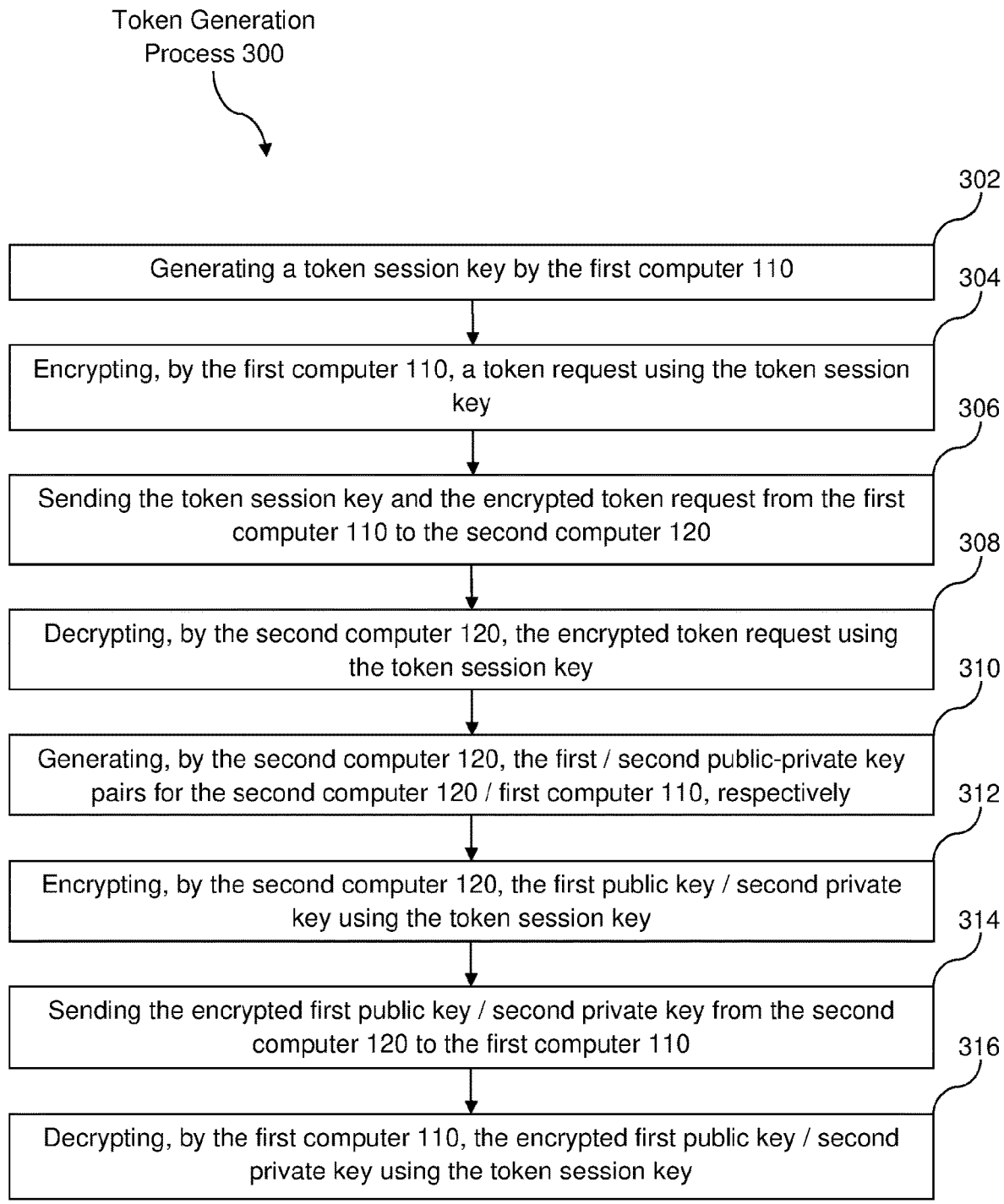
FIG. 3A is a flowchart illustration of a token generation process performed by the first and second computers for the second computer to generate asymmetric key pairs.

In some embodiments, the first/second public-private key pairs are generated by the second computer 120. With reference to FIG. 3A, the method 200 further comprises cooperatively performing, by the first computer 110 and the second computer 120, a token generation process 300 before executing the first data communication instruction. This may happen if the first computer 110 is communicating the first data to the second computer 120 for the first time, and the first/second public-private key pairs have not been previously generated. The token generation process 300 comprises a step 302 of generating a token session key by the first computer 110. The token session key is a symmetric key used for both encryption and decryption, and may have an expiry condition such as a predefined valid period.

The token generation process 300 further comprises a step 304 of encrypting, by the first computer 110, a token request using the token session key, the token request being for requesting at least the first/second public-private key pairs from the second computer 120. The token generation process 300 further comprises a step 306 of sending the token session key and the encrypted token request from the first computer 110 to the second computer 120. The token generation process 300 further comprises a step 308 of decrypting, by the second computer 120, the encrypted token request using the token session key. The token generation process 300 further comprises a step 310 of generating, by the second computer 120, the first/second public-private key pairs for the second computer 120/first computer 110, respectively. The token generation process 300 further comprises a step 312 of encrypting, by the second computer 120, the first public key/second private key using the token session key. The token generation process 300 further comprises a step 314 of sending the encrypted first public key/second private key from the second computer 120 to the first computer 110. The token generation process 300 further comprises a step 316 of decrypting, by the first computer 110, the encrypted first public key/second private key using the token session key. The first computer 110 is thus able to use the first public key to encrypt the first session key and the second private key to decrypt the second session key. Accordingly, the token generation process 300 enables the second computer 120 to generate the first public-private key pair and/or the second public-private key pair.

Figure 3B:
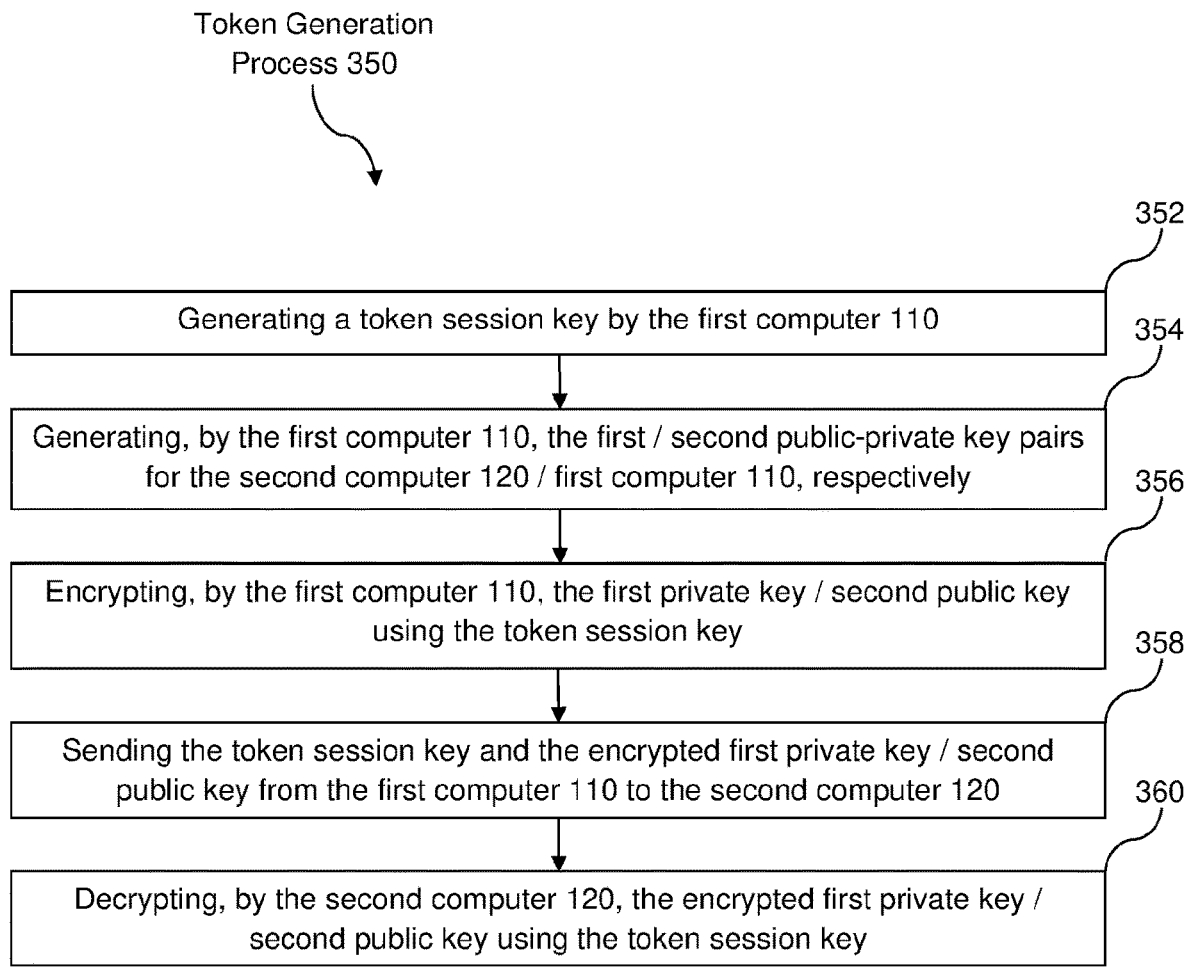
FIG. 3B is a flowchart illustration of a token generation process performed by the first and second computers for the first computer to generate asymmetric key pairs.

In some embodiments, the first/second public-private key pairs are generated by the first computer 110. With reference to FIG. 3B, the method 200 further comprises cooperatively performing, by the first computer 110 and the second computer 120, a token generation process 350 before executing the first data communication instruction. It will be appreciated that various aspects of the token generation process 300 apply similarly or analogously to the token generation process 350 and vice versa, and such aspects are omitted from the description of the token generation process 350 for purpose of brevity.

The token generation process 350 comprises a step 352 of generating a token session key by the first computer 110. The token generation process 350 further comprises a step 354 of generating, by the first computer 110, the first/second public-private key pairs for the second computer 120/first computer 110, respectively. The token generation process 350 further comprises a step 356 of encrypting, by the first computer 110, the first private key/second public key using the token session key. The token generation process 350 further comprises a step 358 of sending the token session key and the encrypted first private key/second public key from the first computer 110 to the second computer 120. The token generation process 350 further comprises a step 360 of decrypting, by the second computer 120, the encrypted first private key/second public key using the token session key. The second computer 120 is thus able to use the first private key to decrypt the first session key and the second public key to encrypt the second session key. Accordingly, the token generation process 350 enables the first computer 110 to generate the first public-private key pair and/or the second public-private key pair.

Figure 1B:
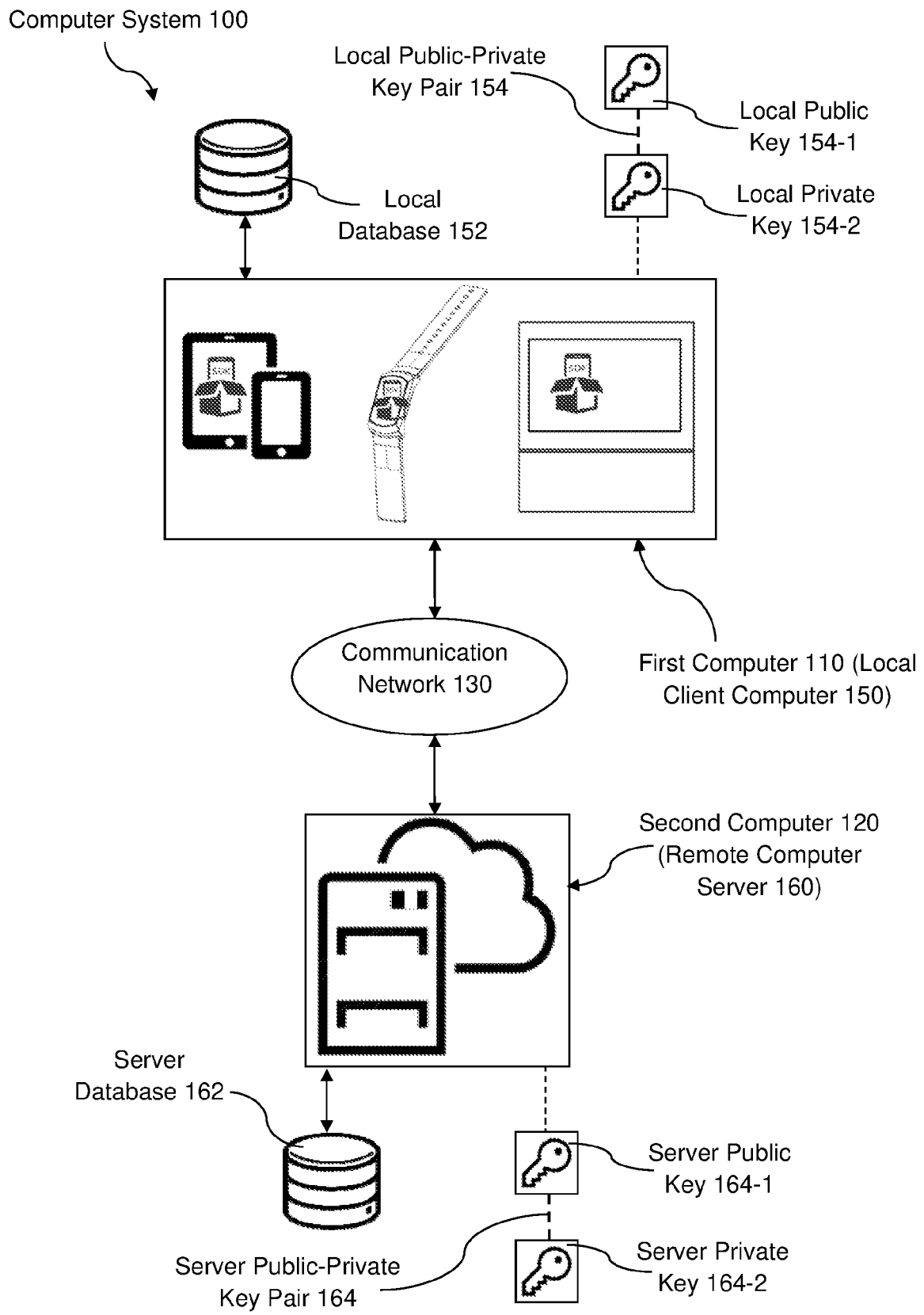
FIG. 1B is a schematic illustration of a computer system for securing data communication between the computers, wherein the first computer is a local client computer and the second computer is a remote computer server.
Figure 1C:
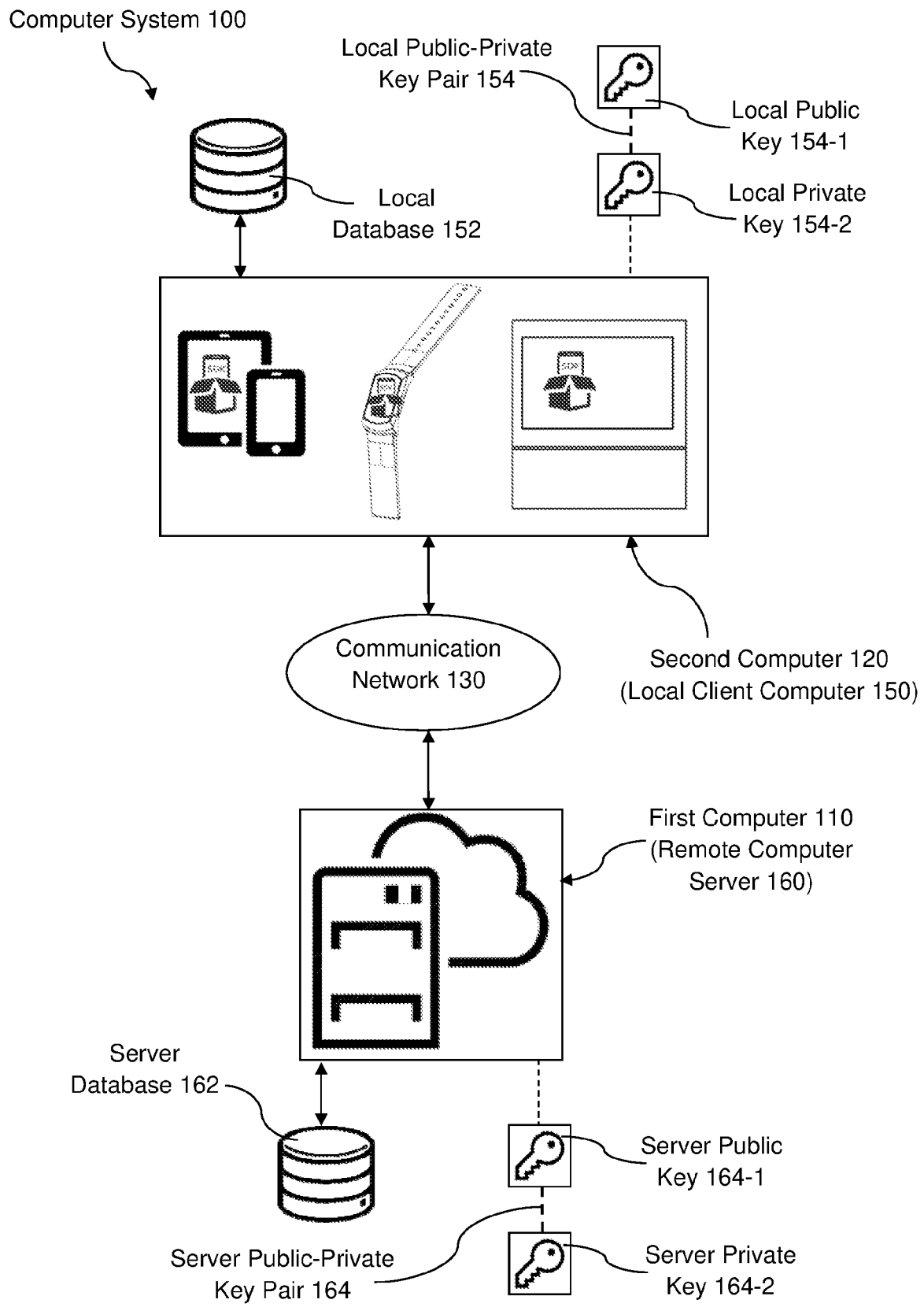
FIG. 1C is a schematic illustration of a computer system for securing data communication between the computers, wherein the first computer is the remote computer server and the second computer is the local client computer.

In some embodiments as shown in FIG. 1B, the first computer 110 is a local client computer 150 and the second computer 120 is a remote computer server 160. In some other embodiments as shown in FIG. 1C, the first computer 110 is the remote computer server 160 and the second computer 120 is the local client computer 150.

The local client computer 150 is a computer or computing device which is operated by an individual or business end user. Some non-limiting examples of the local client computer 150 include a desktop device, mobile device, tablet device, laptop computer, wearable device, and any other electronic device which may have processors, microprocessors, central processing units, or controllers. The local client computer 150 is communicable with the remote computer server 160 via the communication network 130, such as for transfer of data to the remote computer server 160 for storing thereon. The local client computer 150 comprises or is communicatively connected to a local database 152 for storing data, and the remote computer server 160 comprises or is communicatively connected to a server database 162 for storing data. The remote computer server 160 is a computer server that is located remotely away from the local client computer 150, i.e. not sharing the same local network of the local client computer 150. As used herein, a computer server is a physical or cloud data processing system on which a server program runs. The server may be implemented in hardware or software, or a combination thereof. The server includes computers, laptops, mini-computers, mainframe computers, any non-transient and tangible machines that can execute a machine-readable code, cloud-based servers, distributed server networks, and a network of computer systems.

In many embodiments, the remote computer server 160 is or comprises a cloud-based server communicable with one or more local client computers 150. Specifically, the cloud-based server provides for web services for end users of the local client computers 150. The cloud-based server may have an open-source server, enterprise server, enterprise-to-enterprise server, enterprise-to-open-source server, or any other server environment suitable for end users to transmit, transfer, and store data in different locations.

The asymmetric public-private key pairs are generated for each of the local client computer 150 and the remote computer server 160 by a token generation process 400. The asymmetric public-private key pairs may be generated by the remote computer server 160 or by the local client computer 150. The public-private key pair generated for the local client computer 150 is referred to as the client public-private key pair 154, the public-private key pair generated for the remote computer server 160 is referred to as the server public-private key pair 164. The client public-private key pair 154 consists of a client public key 154-1 and a client private key 154-2. The server public-private key pair 164 consists of a server public key 164-1 and a server private key 164-2. Each of the client public-private key pair 154 and the server public-private key pair 164 may be the first public-private key pair or second public-private key pair described in various embodiments herein.

The token generation process 400 is cooperatively performed by the local client computer 150 and the remote computer server 160 before they can perform encryption/decryption of data. Specifically, the token generation process 400 is performed before the step 202 of executing the first data communication instruction and before the step 252 of executing the second data communication instruction. The token generation process 400 may occur through the use of an OAuth 2.0 standard protocol for authentication and authorization on the Internet. Various steps of the token generation process 400 are performed using at least one client application executed on the local client computer 150. In one embodiment, the client application is pre-installed on the local client computer 150. In another embodiment, the client application is not pre-installed but the client may request for the client application through the operating system of the local client computer 150, such as iOS, Android, and the like, and to subsequently download and install the client application.

In some embodiments, the token generation process 400 is cooperatively performed by the local client computer 150 and the remote computer server 160 and the asymmetric public-private key pairs are generated by the remote computer server 160. The token generation process 400 involves at least three HTTPS sessions, as described below with reference to FIG. 4A to FIG. 4C.

Figure 4A:
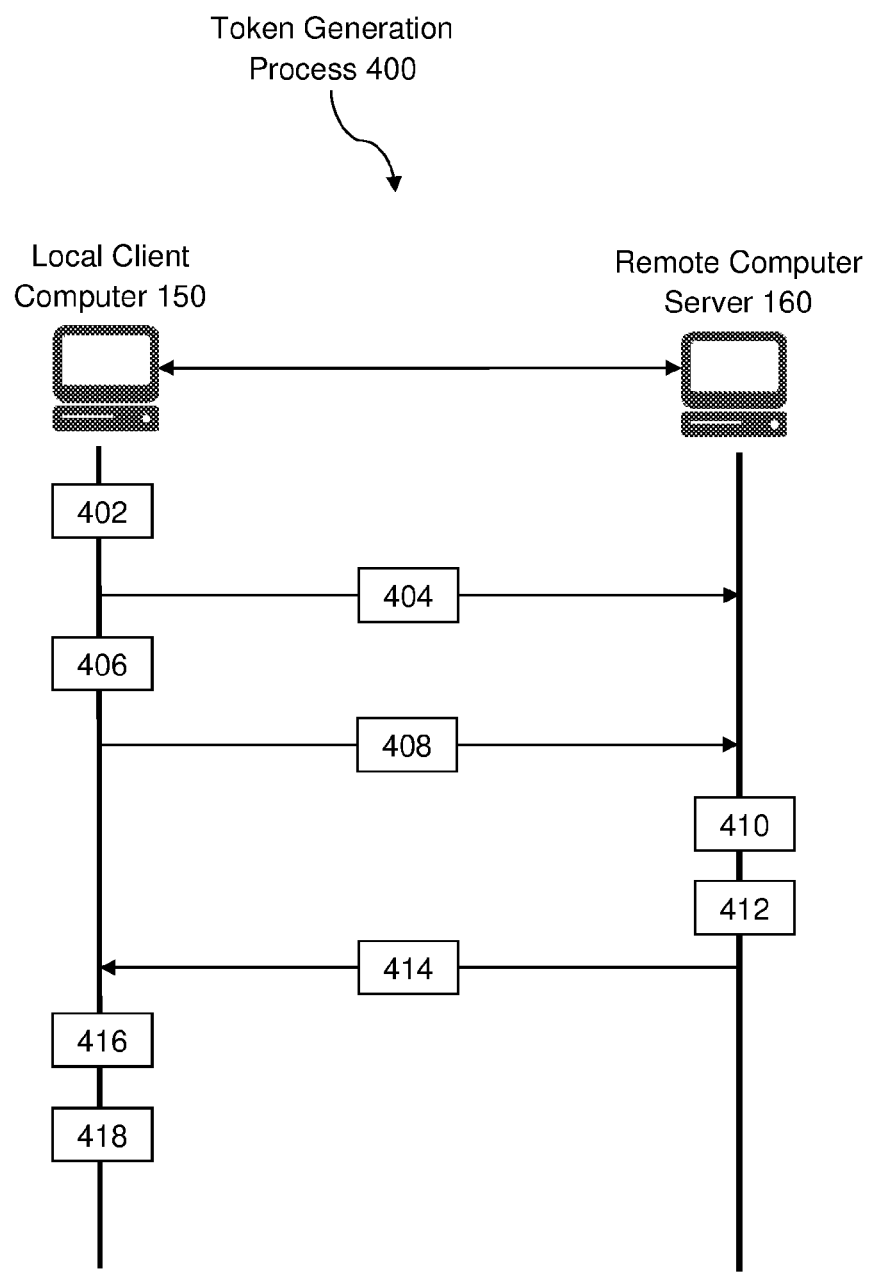
FIG. 4A to FIG. 4D are schematic illustrations of a token generation process performed by the local client computer and the remote computer server.

In the first HTTPS session with reference to FIG. 4A, in a step 402, the local client computer 150 generates a token session key which is a symmetric key. In a step 404, the local client computer 150 sends the token session key to the remote computer server 160. In a step 406, the local client computer 150 encrypts a login request using the token session key, the login request for rendering a login page on an embedded browser of the client application. In a step 408, the local client computer 150 sends the encrypted login request to the remote computer server 160. In a step 410, the remote computer server 160 decrypts the encrypted login request using the token session key and further processes the login request. In a step 412, the remote computer server 160 encrypts a client login page using the token session key. In a step 414, the remote computer server 160 sends the encrypted client login page to the local client computer 150. In a step 416, the local client computer 150 decrypts the encrypted client login page using the token session key. In a step 418, the local client computer 150 displays the decrypted client login page on the embedded browser.

In some embodiments, there is no encryption in the first HTTPS session. Specifically, the local client computer 150 sends an unencrypted login request to the remote computer server 160 for rendering a login page on the browser. The remote computer server 160 receives and processes the login request. The remote computer server 160 sends an unencrypted client login page to the local client computer 150 for display on the embedded browser.

Figure 4B:
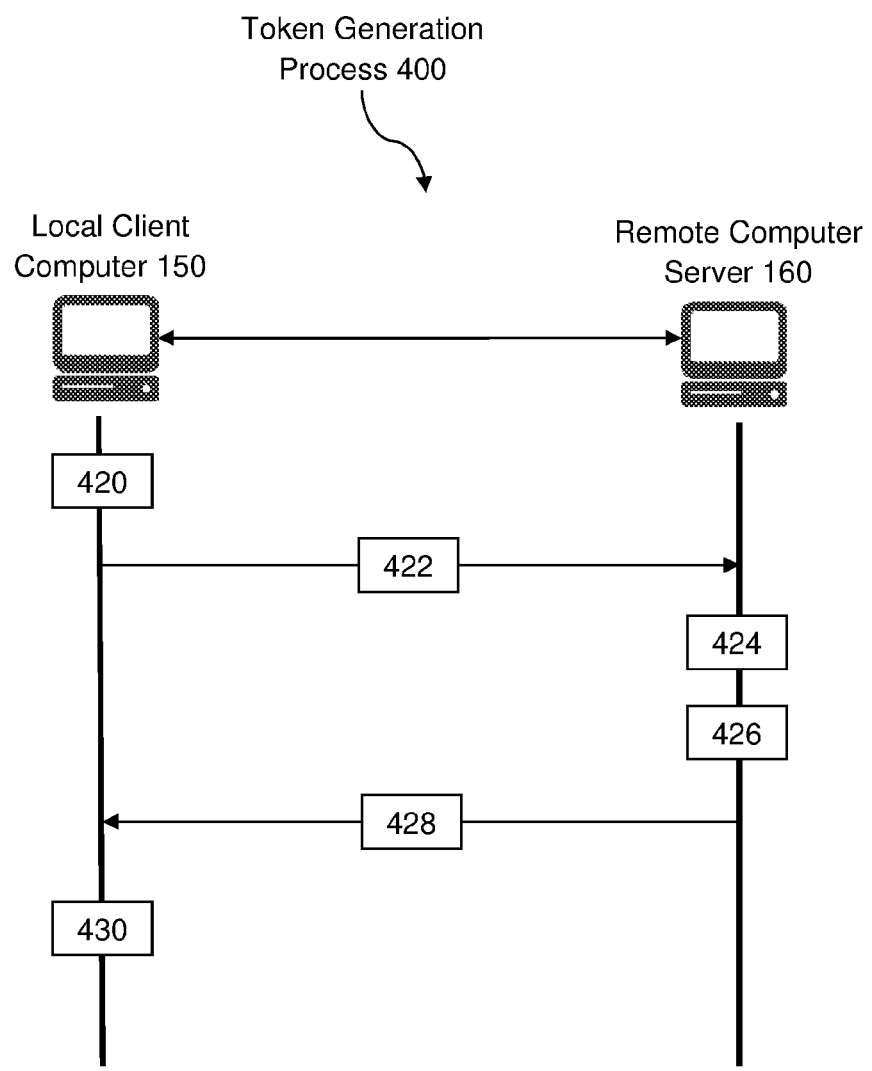

In the second HTTPS session with reference to FIG. 4B, in a step 420, the user or client enters client login details including a username and/or password at the client login page. Each of the username and password may be any combination or string of numbers, alphabets, text, and characters, etc. In a step 422, the local client computer 150 sends the client login details to the remote computer server 160 for authentication. In a step 424, the remote computer server 160 authenticates the client login details and generates a message authentication code (MAC). The MAC is also referred to as a tag and is a short piece of information to authenticate a message, such as the client login details, thereby protecting the message's data integrity and authenticity. In a step 426, the remote computer server 160 encrypts the MAC using the token session key. In a step 428, the remote computer server 160 sends the encrypted MAC to the local client computer 150. In a step 430, the local client computer 150 decrypts the encrypted MAC using the token session key. Alternatively, the MAC may not be encrypted. The MAC authorizes the client to successfully login to the browser and the client may remain logged in for a predefined time period which may be set by the client. The client may now request public-private key pairs from the remote computer server 160 using the browser.

Figure 4C:
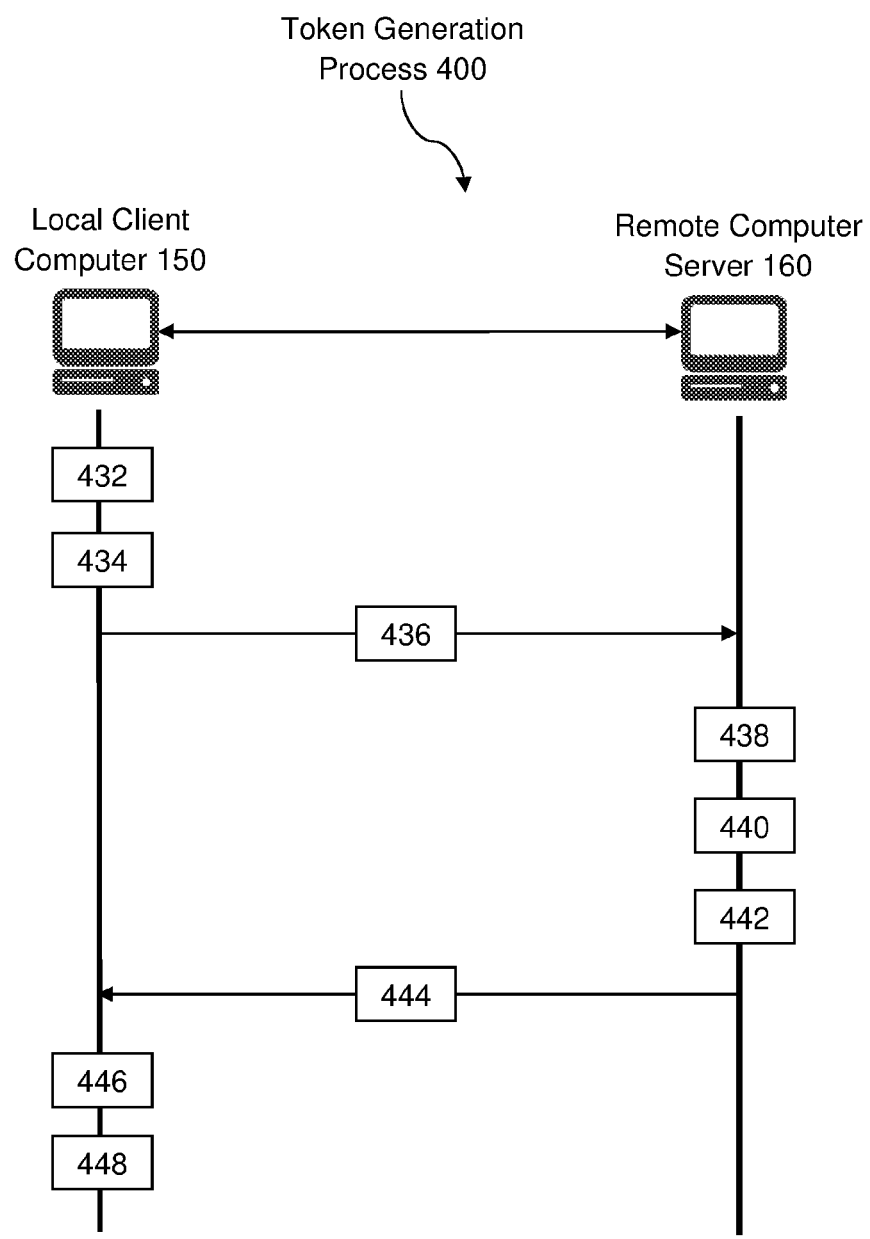

In the third HTTPS session with reference to FIG. 4C, in a step 432, the local client computer 150 initiates a token request for public-private key pairs from the remote computer server 160. In a step 434, the local client computer 150 encrypts the token request using the token session key. In a step 436, the local client computer 150 sends the encrypted token request to the remote computer server 160. In a step 438, the remote computer server 160 decrypts the encrypted token request using the token session key and further processes the token request. In a step 440, the remote computer server 160 generates two public-private key pairs, including the client public-private key pair 154 for the local client computer 150 and the server public-private key pair 164 for the remote computer server 160. Optionally in the step 440, the remote computer server 160 further generates a client token for the local client computer 150. The client token may serve to identify the client and/or the local client computer 150, such as to enable the remote computer server 160 to identify the client public-private key pair 154 generated for the local client computer 150.

In a step 442, the remote computer server 160 encrypts the client private key 154-2, the server public key 164-1, and the client token using the token session key. In a step 444, the remote computer server 160 sends the encrypted client private key 154-2, the encrypted server public key 164-1, and the encrypted client token to the local client computer 150 for subsequent decryption by the local client computer 150 using the token session key. These may be sent in series, parallel, blocks, or partitions, as will be readily understood by the skilled person. In a step 446, the local client computer 150 decrypts the encrypted client private key 154-2, the encrypted server public key 164-1, and the encrypted client token using the token session key. In a step 448, the local client computer 150 extracts the client private key 154-2, server public key 164-1, and client token in response to said decryption thereof and stores them on the local database 152 thereof. Each of the client public-private key pair 154, the server public-private key pair 164, and the client token may have an expiry condition configurable by the local client computer 150 and/or the remote computer server 160, such as those described above for the first and second public-private key pairs. For example, the expiry condition is a predefined valid period corresponding to the predefined valid period of the token session key. Thus, the expiry condition would be met after expiry of the token session key.

Figure 4D:
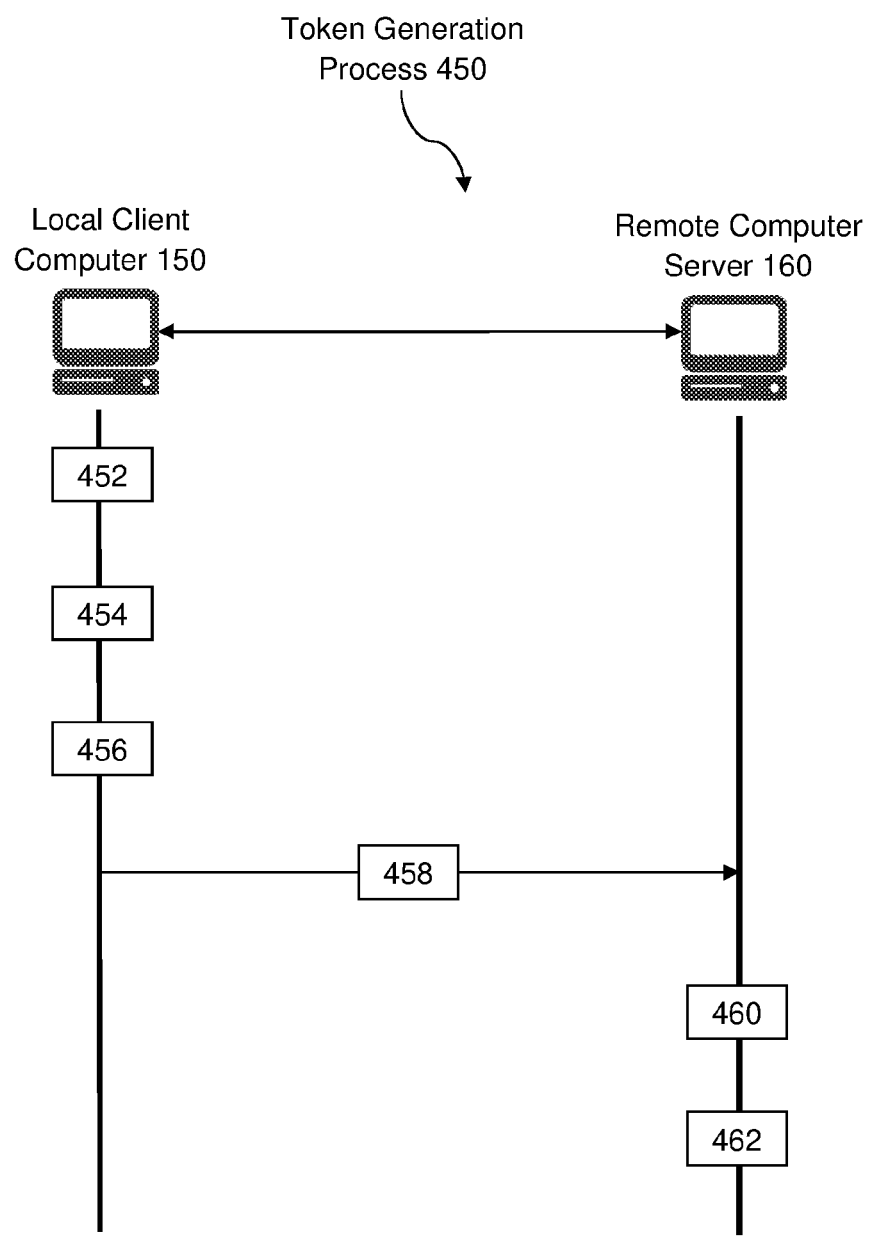

In some embodiments, the asymmetric public-private key pairs are generated by the local client computer 150 instead of the remote computer server 160. This is described as a token generation process 450 with reference to FIG. 4D. The token generation process 450 is cooperatively performed by the local client computer 150 and the remote computer server 160 via one or more HTTPS sessions. It will be appreciated that various aspects of the token generation process 400 apply similarly or analogously to the token generation process 450 and vice versa, and such aspects are omitted from the description of the token generation process 450 for purpose of brevity.

In a step 452, the local client computer 150 generates a token session key which is a symmetric key. In a step 454, the local client computer 150 generates two public-private key pairs, including the client public-private key pair 154 for the local client computer 150 and the server public-private key pair 164 for the remote computer server 160. Optionally in the step 454, the local client computer 150 further generates a client token for the local client computer 150. The client token may serve to identify the client and/or the local client computer 150, such as to enable the remote computer server 160 to identify the client public-private key pair 154 generated for the local client computer 150.

In a step 456, the local client computer 150 encrypts the client public key 154-1, the server private key 164-2, and the client token using the token session key. In a step 458, the local client computer 150 sends the token session key, the encrypted client public key 154-1, the encrypted server private key 164-2, and the encrypted client token to the remote computer server 160 for subsequent decryption by the remote computer server 160 using the token session key. These may be sent in series, parallel, blocks, or partitions, as will be readily understood by the skilled person. In one embodiment, the keys are generated and sent to the remote computer server 160 when there is an active communication link or active HTTPS session between the local client computer 150 and the remote computer server 160. In another embodiment, the keys are generated in an offline mode wherein the local client computer 150 is communicatively disconnected from the remote computer server 160, such as due to lack of Internet connectivity. The keys may be stored on the local database 152 of the local client computer 150 and subsequently sent to the remote computer server 160 after establishing an active communication link with the remote computer server 160.

In a step 460, the remote computer server 160 decrypts the encrypted client public key 154-1, the encrypted server private key 164-2, and the encrypted client token using the token session key. In a step 462, the remote computer server 160 extracts the client public key 154-1, server private key 164-2, and client token in response to said decryption thereof and stores them on the server database 162 thereof.

Figure 5:
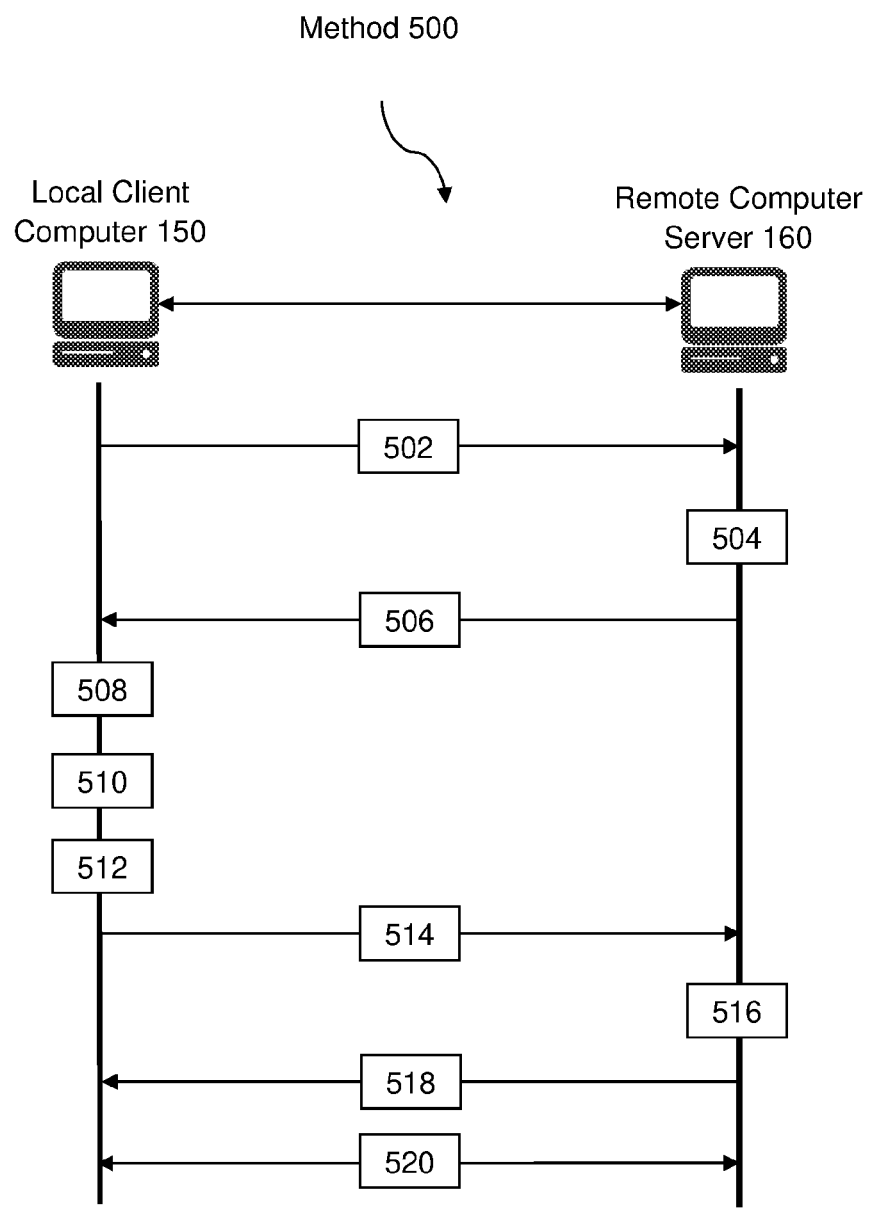
FIG. 5 is a schematic illustration of a method for establishing a secure session between the local client computer and the remote computer server over the HTTPS protocol.

In any session-based encryption, such as in the HTTPS sessions described above, there is a process, function, or method 500 for providing and establishing a secure session over the HTTPS protocol. With reference to FIG. 5, in a step 502, a user or client provides an instruction through the client application to request for a TLS/SSL connection to the remote computer server 160. In a step 504, the remote computer server 160 may use an application programming interface (API) with a set of programming functions to retrieve or generate a TLS/SSL certificate that may be associated with the server public key 164-1. In a step 506, the remote computer server 160 sends the TLS/SSL certificate and the server public key 164-1 to the local client computer 150. In a step 508, the local client computer 150 validates and authenticates the TLS/SSL certificate and the server public key 164-1. In a step 510, the local client computer 150 generates a session key or symmetric key, such as the first session key in the step 204 and the second session key in the step 254. In a step 512, the local client computer 150 encrypts the session key using the server public key 164-1. In a step 514, the local client computer 150 sends the encrypted session key to the remote computer server 160. In a step 516, the remote computer server 160 decrypts the encrypted session key using the server private key 164-2. In a step 518, the remote computer server 160 sends a message to the local client computer 150 to acknowledge completion of said decryption of the session key. In a step 520, the local client computer 150 and the remote computer server 160 can subsequently communicate and exchange data using the session key which is now shared between them.

Figure 6A:
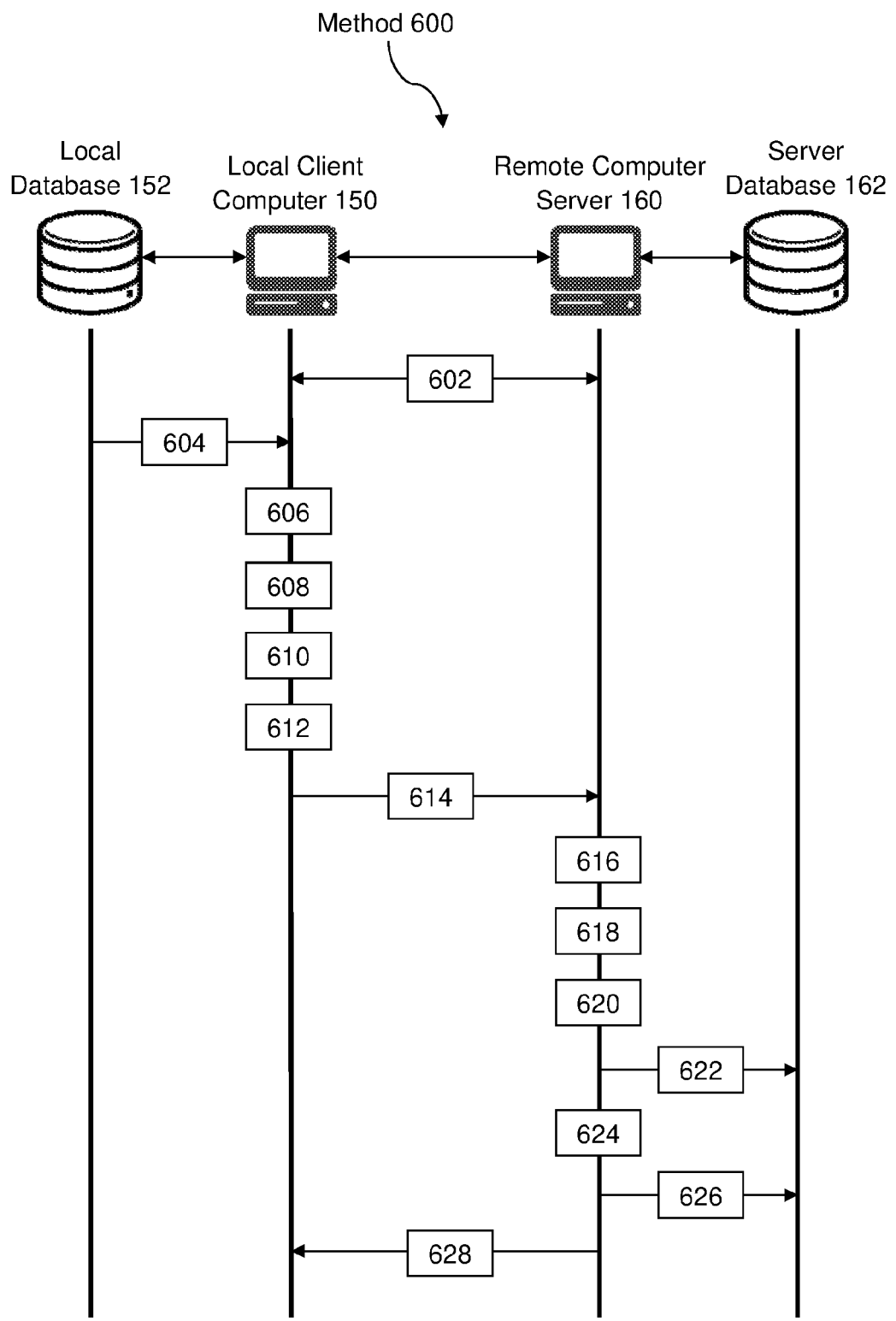
FIG. 6A is a schematic illustration of a method for securing data communication between the local client computer and the remote computer server and for storing first data on the remote computer server.

In some embodiments with reference to FIG. 6A, there is a process, function, or method 600 for securing data communication between the local client computer 150 and the remote computer server 160 over the HTTPS protocol. Various steps of the method 600 are performed using the client application installed and executed on the local client computer 150.

In a step 602 of the method 600, the local client computer 150 executes a first data communication instruction in cooperation with the remote computer server 160 for storing first data on the remote computer server 160. The first data may comprise measurement data collected from medical procedures performed on various subjects/patients. The measurement data may comprise at least one of a set of series of heart rate data, a set of series of blood pressure data, a set of series of pulse pressure data. For example, the measurement data comprises a plurality of series of heart rate data, including a first series of heart rate data collected in a first time period and a second series of heart rate data collected in a second time period.

In a step 604, the local client computer 150 retrieves the measurement data stored on the local database 152. In a step 606, the local client computer 150 compresses the measurement data by using a data compression algorithm, such as Run-Length Encoding (RLE), Huffman Coding, LZ77, LZ78, and the like and any combination thereof. Alternatively, the measurement data is uncompressed but may be compressible. In a step 608, the local client computer 150 generates a first session key. In a step 610, the local client computer 150 encrypts the measurement data using the first session key. In a step 612, the local client computer 150 encrypts the first session key using the server public key 164-1 generated from the token generation process 400/450. In a step 614, the local client computer 150 sends the encrypted measurement data and the encrypted first session key to the remote computer server 160.

Thus, in the above steps of the method 600, the local client computer 150 can send the measurement data, such as the first and second series of heart rate data, at any given time to the remote computer server 160 over the HTTPS protocol. In a step 616, the remote computer server 160 decrypts the encrypted first session key using the server private key 164-2 and extracts the decrypted first session key. In a step 618, the remote computer server 160 decrypts the encrypted measurement data using the decrypted first session key and extracts the decrypted measurement data. In a step 620, the measurement data may be compressed and the remote computer server 160 decompresses the compressed measurement data to its original uncompressed state. Alternatively, the measurement data may be originally uncompressed. In a step 622, the remote computer server 160 stores the measurement data on the server database 162 based on the first data communication instruction.

In a step 624, the remote computer server 160 uses a set of algorithms to combine and/or manipulate the measurement data to generate fine-grained data. In a step 626, the remote computer server 160 stores the fine-grained data together with the measurement data on the server database 162. The fine-grained data may be generated such that each data element therein has its own access control policy for cloud computing, as will be readily understood by the skilled person. In some situations, the remote computer server 160 operates a cloud computing service which the client subscribes to through paid subscription for the cloud computing service. The remote computer server 160 generates the fine-grained if the subscription fees are timely paid. Conversely, if the subscription fees are not timely paid, the remote computer over 160 may terminate or restrict the cloud computer service, such as by restricting the set of algorithms from generating the fine-grained data in the step 624, although this may optimize the process flow of the method 600 to store the measurement data on the server database 162. In a step 628, the remote computer server 160 sends a message to the local client computer 150 to acknowledge completion of the step 622 of storing the measurement data/fine-grained data on the server database 162.

Figure 6B:
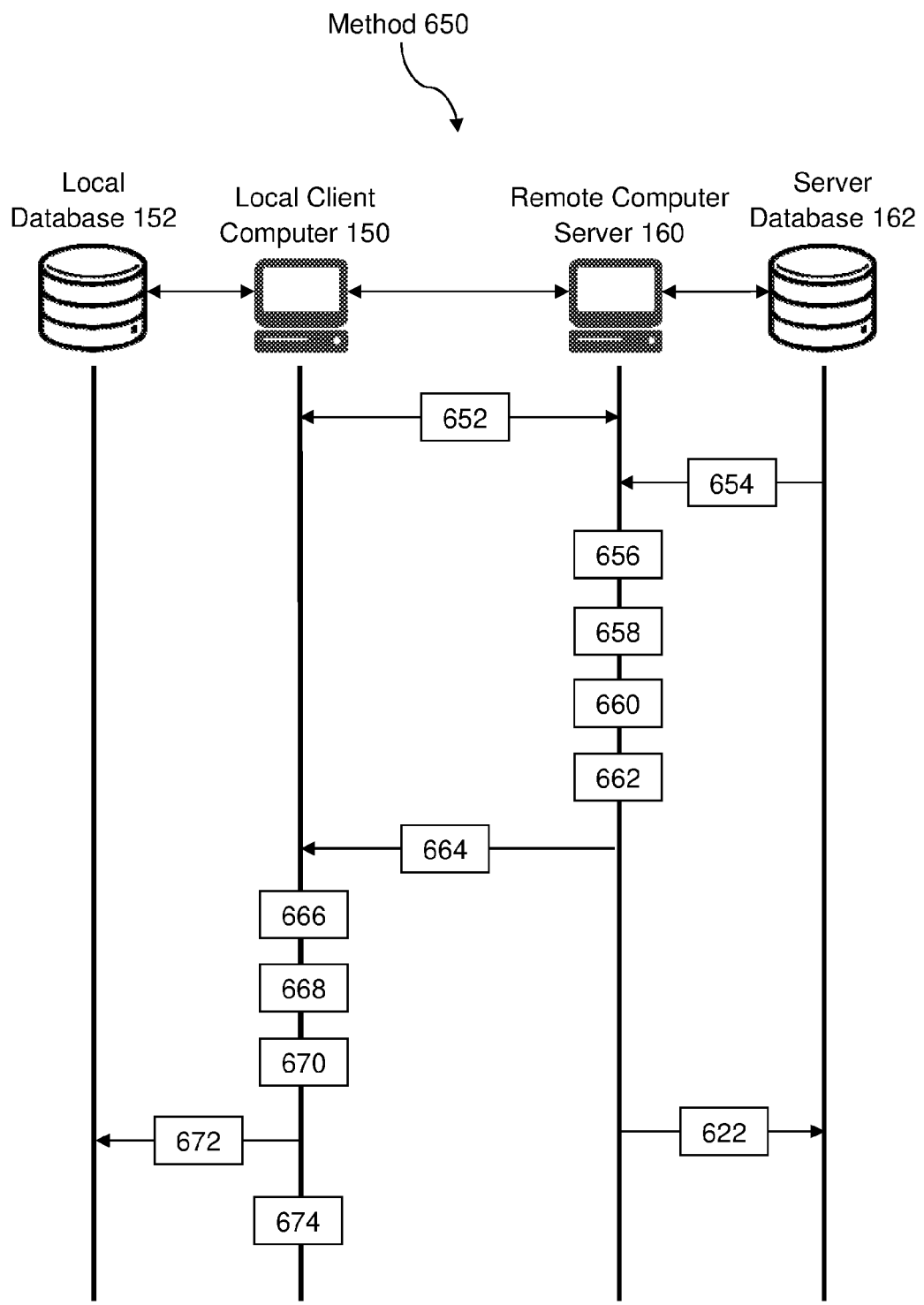
FIG. 6B is a schematic illustration of a method for securing data communication between the local client computer and the remote computer server and for retrieving second data from the remote computer server.

In some embodiments with reference to FIG. 6B, there is a process, function, or method 650 for securing data communication between the local client computer 150 and the remote computer server 160 over the HTTPS protocol. Various steps of the method 650 are performed using the client application installed and executed on the local client computer 150. In a step 652 of the method 650, the local client computer 150 executes a second data communication instruction in cooperation with the remote computer server 160 for retrieving second data from the remote computer server 160. The second data may comprise historical measurement data and/or historical fine-grained data stored on the server database 162 as described above in the method 600.

In a step 654, the remote computer server 160 retrieves the historical measurement/fine-grained data stored on the server database 162. In a step 656, the remote computer server 160 compresses the historical measurement/fine-grained data by using a data compression algorithm described above. Alternatively, the historical measurement/fine-grained data is uncompressed but may be compressible. In a step 658, the remote computer server 160 generates a second session key. In a step 660, the remote computer server 160 encrypts the historical measurement/fine-grained data using the second session key. In a step 662, the remote computer server 160 encrypts the second session key using the client public key 154-1 generated from the token generation process 400/450. The second data communication instruction may comprise a client token that identifies the local client computer 150 and/or the client using it for the remote computer server 160 to identify the client public key 154-1 generated for the local client computer 150. In a step 664, the remote computer server 160 sends the encrypted historical measurement/fine-grained data and the encrypted second session key to the local client computer 150.

In a step 666, the local client computer 150 decrypts the encrypted second session key using the client private key 154-2 generated from the token generation process 400/450 and extracts the decrypted second session key. In a step 668, the local client computer 150 decrypts the encrypted historical measurement/fine-grained data using the decrypted second session key and extracts the decrypted historical measurement/fine-grained data. In a step 670, the historical measurement/fine-grained data may be compressed and the local client computer 150 decompresses the compressed historical measurement/fine-grained data to its original uncompressed state. Alternatively, the historical measurement/fine-grained data may be originally uncompressed. In a step 672, the local client computer 150 stores the historical measurement/fine-grained data on the local database 152 based on the second data communication instruction. In a step 674, the local client computer 150 displays the historical measurement/fine-grained data on the client application. In one embodiment, the local client computer 150 receives only the historical measurement data and may use a set of algorithms to combine and/or manipulate the historical measurement data to generate the fine-grained data.

Thus, in the above steps of the method 650, the local client computer 150 can retrieve the historical measurement/fine-grained data at any given time from the remote computer server 160 over the HTTPS protocol. In one embodiment, the second data communication instruction is a single request to retrieve at least one set of the historical measurement/fine-grained data. If the client wants to retrieve another set or additional sets of the historical measurement/fine-grained data, additional second data communication instructions are executed. Accordingly, the skilled person will readily understand that the second data communication instruction may be repeated for retrieving more than one packet or set of historical measurement/fine-grained data from the remote computer server 160.

Figure 7A:
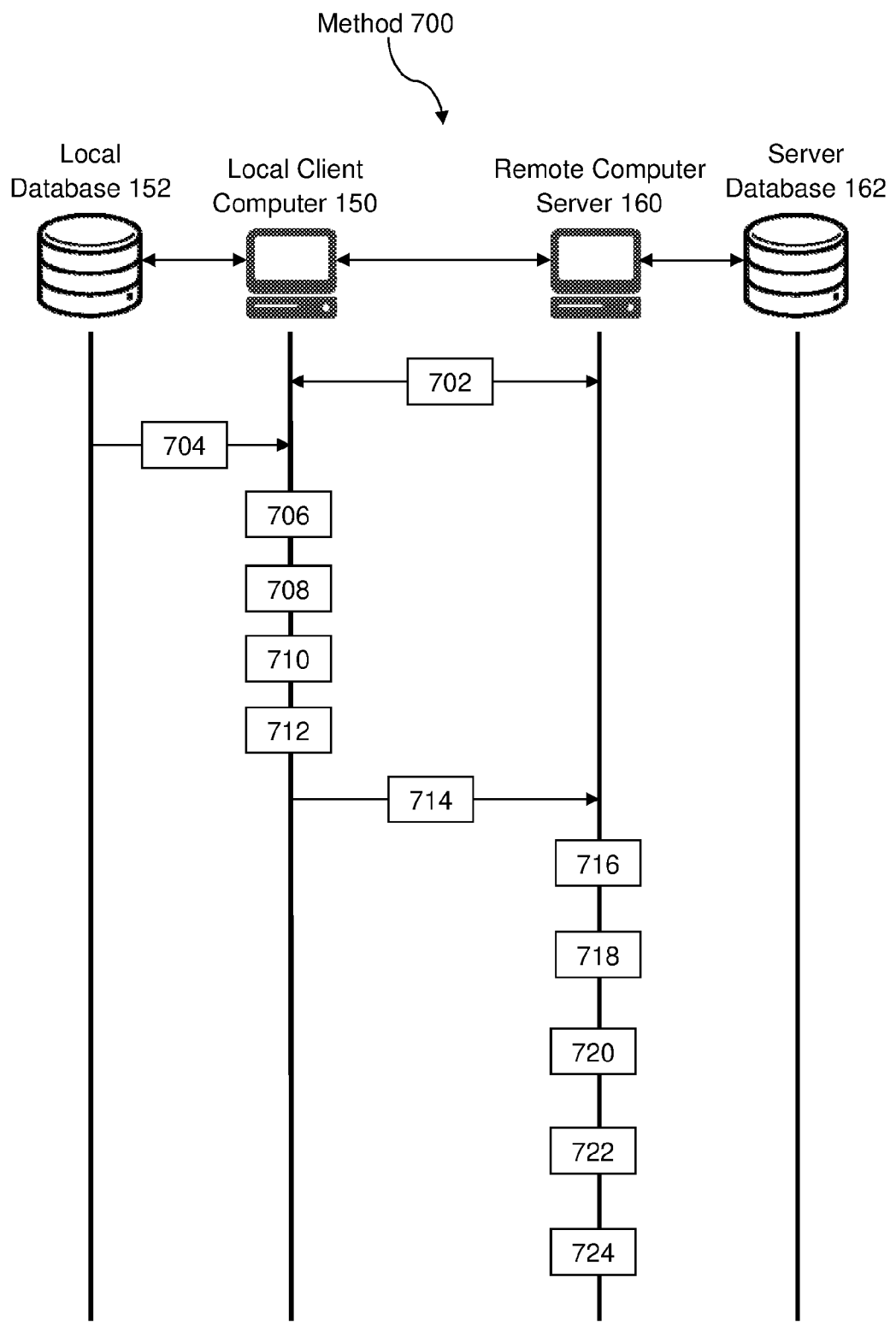
FIG. 7A and FIG. 7B is a schematic illustration of a method for securing data communication between the local client computer and the remote computer server and for authenticating first data.
Figure 7B:
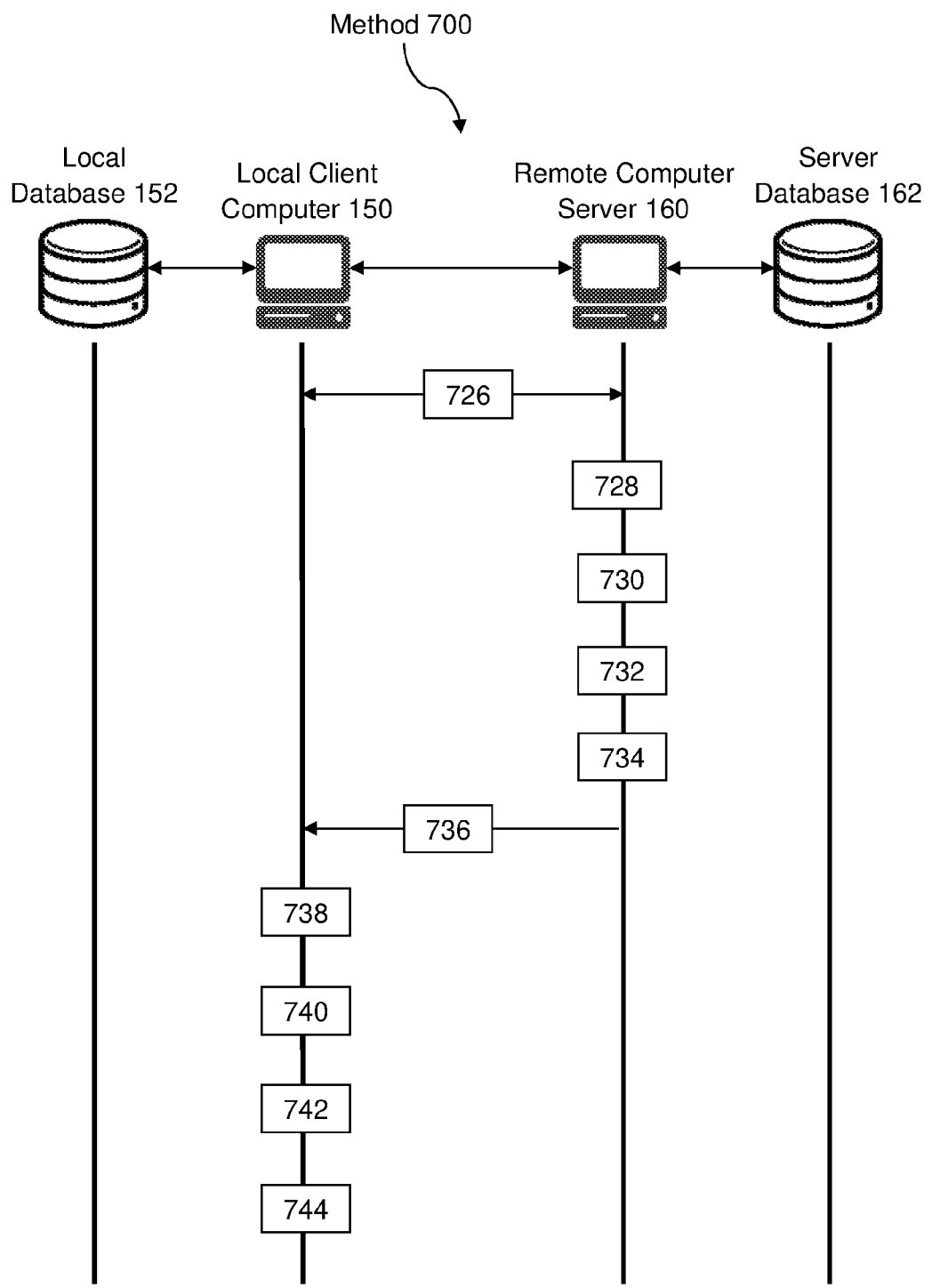

In some embodiments with reference to FIG. 7A and FIG. 7B, there is a process, function, or method 700 for securing data communication between the local client computer 150 and the remote computer server 160 over the HTTPS protocol. Various steps of the method 700 are performed using the client application installed and executed on the local client computer 150.

In a step 702 of the method 700 with reference to FIG. 7A, the local client computer 150 executes a first data communication instruction in cooperation with the remote computer server 160 for the remote computer server 160 to authenticate first data. The first data comprises authentication data/information which may include a username and/or password of the client or user of the local client computer 150. The authentication data may be required for accessing other applications on the local client computer 150 and/or other modules of the client application. The first data communication instruction may thus be referred to as an authentication request.

In a step 704, the local client computer 150 obtains the authentication data. The authentication data may be retrieved from the local database 152 or provided by the client. In a step 706, the local client computer 150 compresses the authentication data by using a data compression algorithm. Alternatively, the authentication data is uncompressed but may be compressible. In a step 708, the local client computer 150 generates a first session key. In a step 710, the local client computer 150 encrypts the authentication data using the first session key. In a step 712, the local client computer 150 encrypts the first session key using the server public key 164-1 generated from the token generation process 400/450. In a step 714, the local client computer 150 sends the encrypted authentication data and the encrypted first session key to the remote computer server 160.

In a step 716, the remote computer server 160 decrypts the encrypted first session key using the server private key 164-2 and extracts the decrypted first session key. In a step 718, the remote computer server 160 decrypts the encrypted authentication data using the decrypted first session key and extracts the decrypted authentication data. In a step 720, the authentication data may be compressed and the remote computer server 160 decompresses the compressed authentication data to its original uncompressed state. Alternatively, the authentication data may be originally uncompressed. In a step 722, the remote computer server 160 processes the authentication data based on the first data communication instruction. Specifically, the remote computer server 160 authenticates the authentication data through a validation process. The validation process includes comparing the authentication data against reference authentication data which is obtained from the client beforehand and stored on the server database 162. In a step 724, the remote computer server 160 generates a MAC in response to successful authentication of the authentication data.

In a step 726 further with reference to FIG. 7B, the remote computer server 160 executes a second data communication instruction in cooperation with the local client computer 150 for sending the MAC to the local client computer 150. In a step 728, the remote computer server 160 compresses the MAC by using a data compression algorithm. Alternatively, the MAC is uncompressed but may be compressible. In a step 730, the remote computer server 160 generates a second session key. In a step 732, the remote computer server 160 encrypts the MAC using the second session key. In a step 734, the remote computer server 160 encrypts the second session key using the client public key 154-1 generated from the token generation process 400/450. In a step 736, the remote computer server 160 sends the encrypted MAC and the encrypted second session key to the local client computer 150.

In a step 738, the local client computer 150 decrypts the encrypted second session key using the client private key 154-2 generated from the token generation process 400/450 and extracts the decrypted second session key. In a step 740, the local client computer 150 decrypts the encrypted MAC using the decrypted second session key and extracts the decrypted MAC. In a step 742, the MAC may be compressed and the local client computer 150 decompresses the compressed MAC to its original uncompressed state. Alternatively, the MAC may be originally uncompressed. In a step 744, the local client computer 150 processes the MAC based on the second data communication instruction. For example, the MAC enables the client to successfully access other applications on the local client computer 150 and/or other modules of the client application.

Figure 8A:
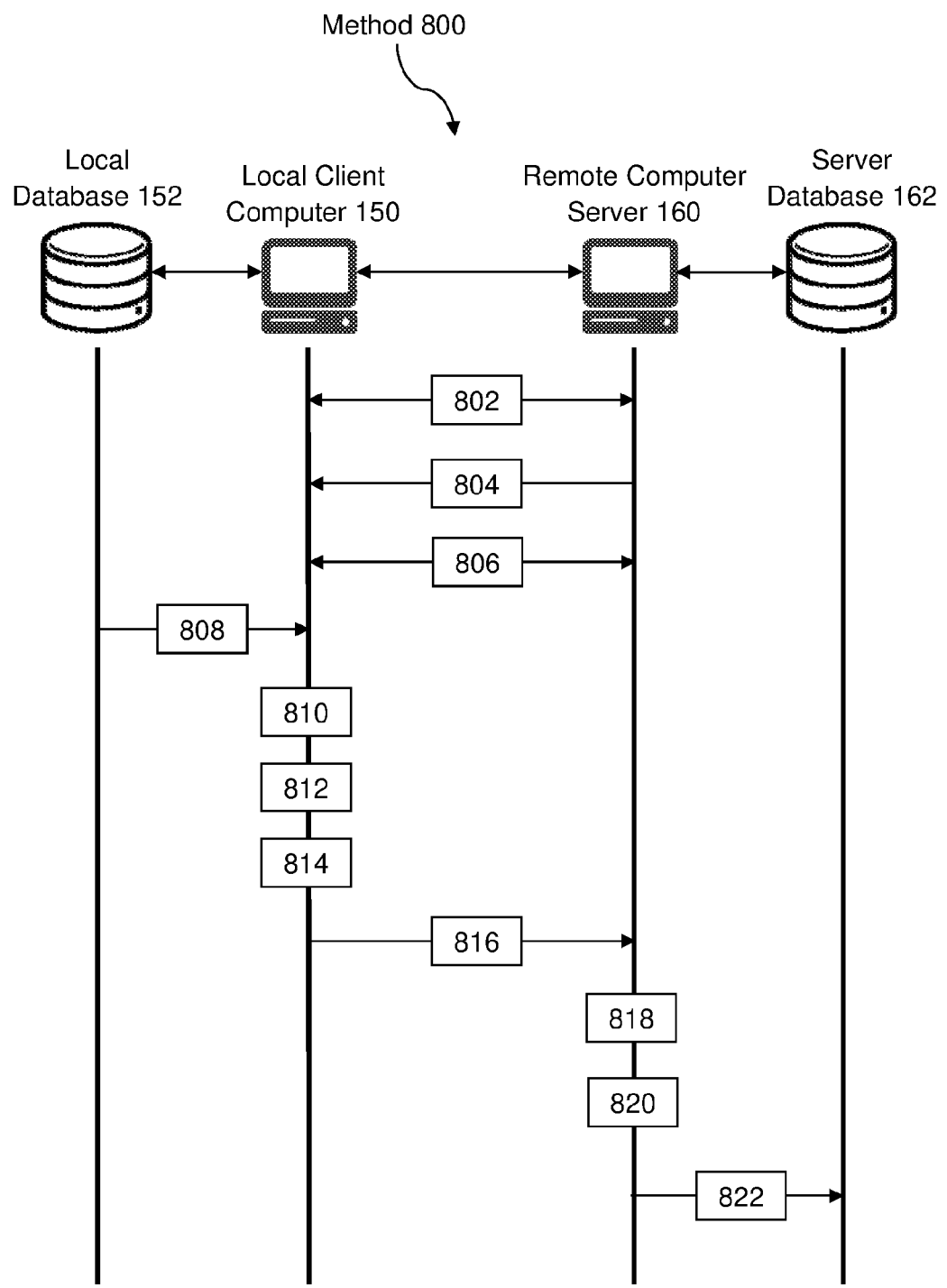
FIG. 8A to FIG. 8C is a schematic illustration of a method for securing data communication between the local client computer and the remote computer server including performing the token generation process.
Figure 8B:
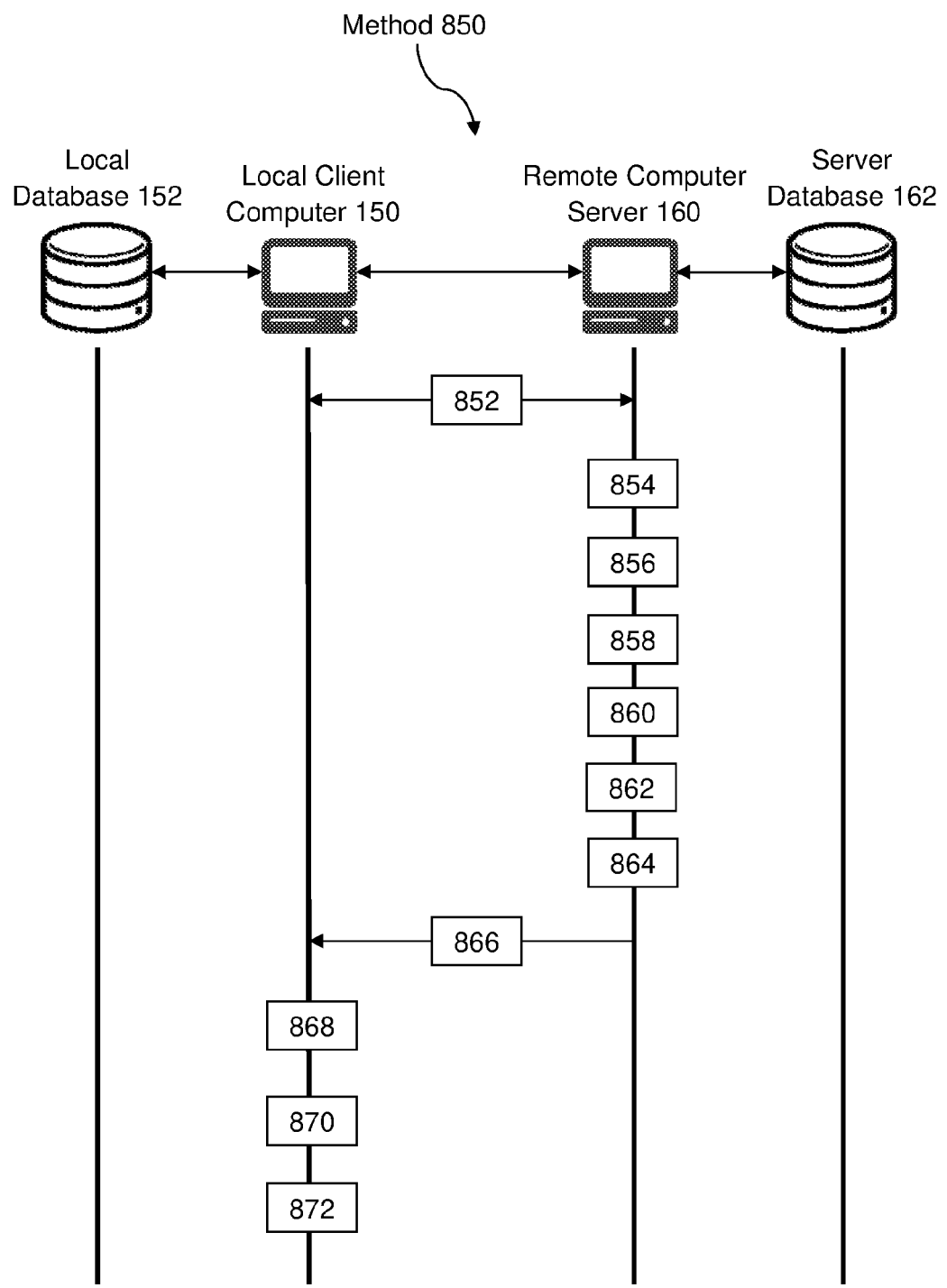
Figure 8C:
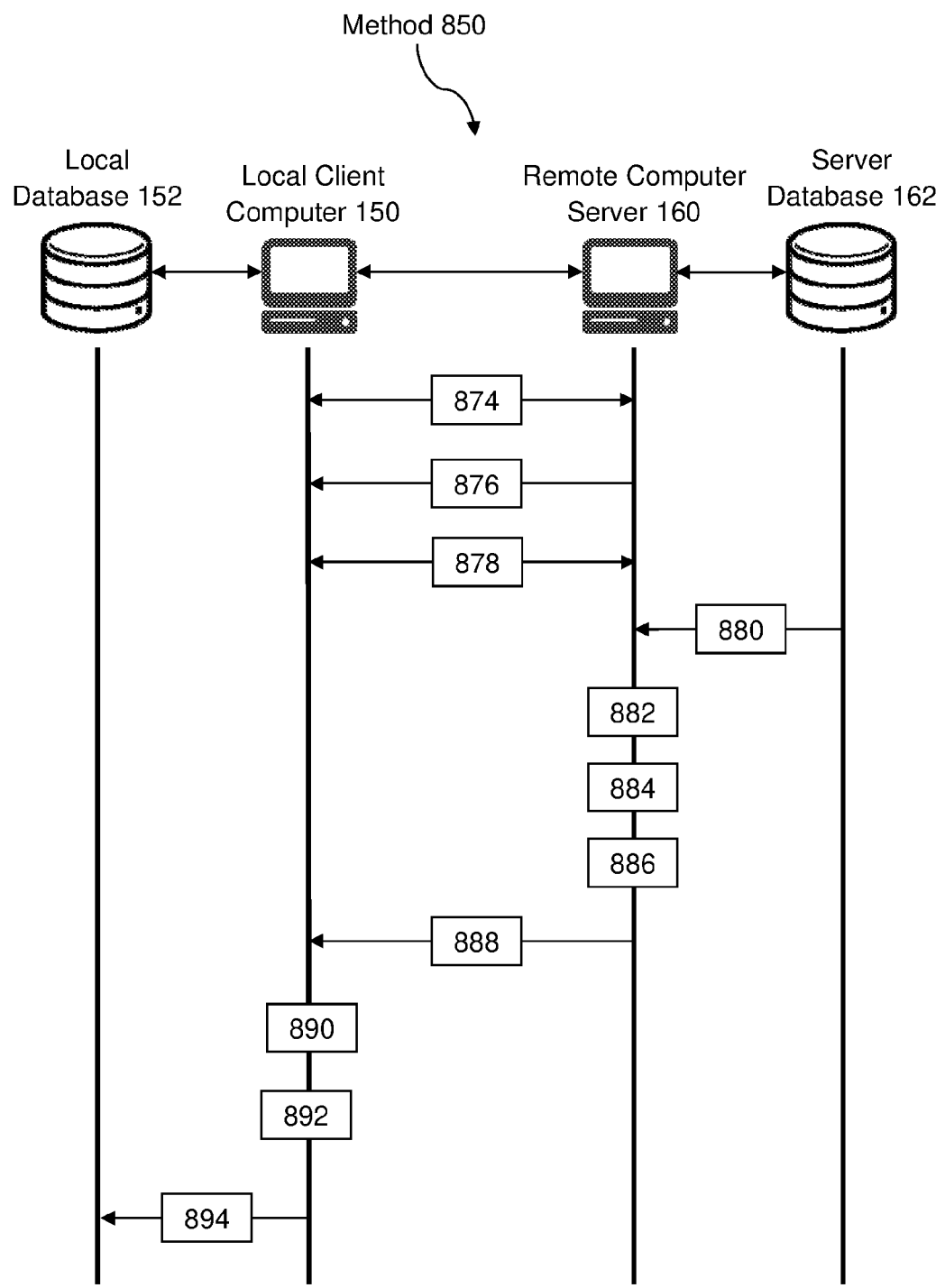

In some embodiments with reference to FIG. 8A to FIG. 8C, there are processes, functions, or methods 800 and 850 for securing data communication between the local client computer 150 and the remote computer server 160 over the HTTPS protocol. Various steps of the methods 800 and 850 are performed using the client application installed and executed on the local client computer 150. The method 800 may be performed for communicating first data to the remote computer server 160 for storing thereon and the method 850 may be performed for retrieving second data from the remote computer server 160. The first data may comprise a current set of data and the second data may comprise a past set of data.

The current set of data may comprise new personal/medical data collected recently which has not been previously sent to the remote computer server 160. The current set of data may be in a document form, data form, records of data, raw data, or any other suitable form. The current set of data may be stored on and retrieved from the local database 152. The past set of data may comprise past data/information collected previously which has already been sent to the remote computer server 160 for storing on the server database 162. The past set of data may be retrieved back from the remote computer server 160 for visualization on the client application.

Each of the current set of data and the past set of data may comprise a compliant set of data and/or a non-compliant set of data. The compliant set of data may comprise a set of personal data, a set of fine-grained data, or any other data that may require regulations or policies to be approved before the local client computer 150 and the remote computer server 160 may be granted access. The compliant data may comprise information on a client account or client profile (e.g. height, weight, and age of the client). The non-compliant set of data may comprise a set of measurement data, a set of raw data, a set of fine-grained data, or any other data that generally do not require any checks before access is granted. The set of fine-grained data may be generated based on a set of algorithms implemented in the local client computer 150 and/or the remote computer server 160. The set of fine-grained data may comprise activity data, sleep data, stress data, or any similar forms of data that relates to the biometrics of subjects/patients. The fine-grained data may be generated based on measurement data or raw data such as but not limited to heart rate, heart rate variability, blood pressure, pulse pressure, any related data measured by sensors, and the like and any combination thereof.

The remote computer server 160 may use an API with a set of programming functions to communicate the compliant/non-compliant data to the local client computer 150. The programming functions may be based on various programming languages, such as but not limited to Java, JavaScript, Python, and Hypertext Markup Language (HTML).

In a step 802 of the method 800 with reference to FIG. 8A, the local client computer 150 performs a first token generation process 400/450 in cooperation with the remote computer server 160 for generating a first client public-private key pair 154a and a first server public-private key pair 164a. In a step 804, the local client computer 150 receives the first server public key 164a-1 and the first client private key 154a-2 from the remote computer server 160. In a step 806, the local client computer 150 executes a first data communication instruction in cooperation with the remote computer server 160 for storing the first data or current set of data on the remote computer server 160. In a step 808, the local client computer 150 retrieves the current set of data stored on the local database 152. The current set of data may be compressed as described in the above embodiments. In a step 810, the local client computer 150 generates a first session key. In a step 812, the local client computer 150 encrypts the current set of data using the first session key. In a step 814, the local client computer 150 encrypts the first session key using the first server public key 164a-1. In a step 816, the local client computer 150 sends the encrypted current set of data and the encrypted first session key to the remote computer server 160.

In some embodiments, the current set of data comprises compliant data and non-compliant data. In one embodiment, the current set of data is encrypted using the first session key, i.e. the compliant data and non-compliant data are encrypted using the same first session key. In another embodiment, the compliant data and non-compliant data are encrypted using different session keys. The local client computer 150 would generate a first session key A for encrypting the compliant data and a first session key B for encrypting the non-compliant data.

The first client public-private key pair 154a and the first server public-private key pair 154b may have an expiry condition wherein they are only valid for a single use. The single-use expiry condition may be suitable for temporary or single-use situations such as for storing of new client account/profile information or for requesting authorization to access data on the remote computer server 160.

In a step 818, the remote computer server 160 decrypts the encrypted first session key using the first server private key 164a-2 and extracts the decrypted first session key. In a step 820, the remote computer server 160 decrypts the encrypted current set of data using the decrypted first session key and extracts the decrypted current set of data. In a step 822, the remote computer server 160 stores the current set of data on the server database 162 based on the first data communication instruction.

The client may subsequently want to retrieve the current set of data and/or past set of data from the remote computer server 160, such as by using the method 850. With reference to FIG. 8B, in a step 852, the local client computer 150 executes a second data communication instruction in cooperation with the remote computer server 160 for requesting authorization to access the current set of data and/or past set of data. The current set of data and/or past set of data may comprise compliant/non-compliant data. In a step 854, the remote computer server 160 determines the client authorization level which decides whether the client is authorized access to the compliant/non-compliant data.

In a step 856, the remote computer server 160 checks a set of client credentials included to qualify the client access level on all or part of the requested data. As part of the processing and dissemination of the compliant/non-compliant data, the remote computer server 160 may determine and/or review according to the client credentials to decide which field of data, data records, raw data, fine-grained data, processed data, or portions of any of said data, that the client may be authorized to request and obtain. Thereafter, the client would be able to view or access all or portions of the compliant/non-compliant data. Additionally, the remote computer server 160 may only authorize the client to access the compliant/non-compliant data within a predefined time period. This allows for the remote computer server 160 to monitor and prevent unrequired data from being placed in an active storage location of the server database 162; the unrequired data may be stored in a dormant storage location of the server database 162.

In a step 858, the remote computer server 160 generates a MAC in response to successful authorization of the client from the step 856. The MAC may be compressed. In a step 860, the remote computer server 160 generates a second session key. In a step 862, the remote computer server 160 encrypts the MAC using the second session key. In a step 864, the remote computer server 160 encrypts the second session key using the first client public key 154a-1. In a step 866, the remote computer server 160 sends the encrypted MAC and the encrypted second session key to the local client computer 150.

In a step 868, the local client computer 150 decrypts the encrypted second session key using the first client private key 154a-2 and extracts the decrypted second session key. In a step 870, the local client computer 150 decrypts the encrypted MAC using the decrypted second session key and extracts the decrypted MAC. In a step 872, the local client computer 150 processes the MAC based on the second data communication instruction. For example, the MAC enables the client to request access to the compliant/non-compliant data.

Further with reference to FIG. 8C, in a step 874, the local client computer 150 performs a second token generation process 400/450 in cooperation with the remote computer server 160 for generating a second client public-private key pair 154b, a second server public-private key pair 164b, and a client token. The second client public-private key pair 154b, the second server public-private key pair 164b, and the client token are required for the client to access the compliant/non-compliant data. The time period for accessing the compliant/non-compliant data can be pre-set according to the volume and/or importance of the data. The second client public-private key pair 154b, the second server public-private key pair 164b, and the client token may have an expiry condition wherein they are only valid for a predefined time period. The predefined time period may be two hours and may help prevent unknown users or clients from gaining access to the compliant/non-compliant data. In a step 876, the local client computer 150 receives the second server public key 164b-1, the second client private key 154b-2, and the client token from the remote computer server 160.

In a step 878, the local client computer 150 executes a third data communication instruction in cooperation with the remote computer server 160 for accessing and retrieving the compliant/non-compliant data from the remote computer server 160. The third data communication instruction may include the client token to identify the local client computer 150/client, and the client token may remain active for a predefined valid period after which the client is logged out from accessing and retrieving the compliant/non-compliant data. The remote computer server 160 may send a timeout or logout message to the local client computer 150 upon expiry of the client token.

In a step 880, the remote computer server 160 queries and retrieves the compliant/non-compliant data stored on the server database 162. In a step 882, the remote computer server 160 generates a third session key. In a step 884, the remote computer server 160 encrypts the compliant/non-compliant data using the third session key. In a step 886, the remote computer server 160 encrypts the third session key using the second client public key 154b-1. In a step 888, the remote computer server 160 sends the encrypted compliant/non-compliant data and the encrypted third session key to the local client computer 150.

In one embodiment, the compliant data and non-compliant data are encrypted using the same third session key. In another embodiment, the compliant data and non-compliant data are encrypted using different session keys. The remote computer server 160 would generate a third session key A for encrypting the compliant data and a third session key B for encrypting the non-compliant data.

In a step 890, the local client computer 150 decrypts the encrypted third session key using the second client private key 154b-2 generated and extracts the decrypted third session key. In a step 892, the local client computer 150 decrypts the encrypted compliant/non-compliant data using the decrypted third session key and extracts the decrypted compliant/non-compliant data. In a step 894, the local client computer 150 stores the compliant/non-compliant data on the local database 152 based on the third data communication instruction.

In one embodiment, the local client computer 150 displays the compliant/non-compliant data for visualization on the client application. In another embodiment, the local client computer 150 distributes the compliant/non-compliant data to other client computers/devices. The local client computer 150 may generate a set of distribution session keys for encrypting the compliant/non-compliant data before communicating the encrypted compliant/non-compliant data to the other client computers/devices. The compliant/non-compliant data may be partitioned into one or more partitions of compliant/non-compliant data. The partitions may be stored in separate storage locations of the local database 152. The partitions may be encrypted by the same distribution session key, or each partition may be encrypted by its own distribution session key. The distribution session keys used to encrypt the compliant/non-compliant data or the partitions thereof are also communicated to the other client computers/devices for decrypting the received data.

Various embodiments described herein relate to securing data communication between the local client computer 150 and the remote computer server 160 by using the security keys 140 for encryption and decryption. The security keys 140 comprise the client public-private key pair 154 and the server public-private key pair 164 generated by the token generation process 400/450. FIG. 9A illustrates an OAuth 2.0 response 900 from the token generation process 400 communicated from the remote computer server 160 to the local client computer 150. The response 900 shows the text string 902 of the client private key 154-2 and the text string 904 of the server public key 164-1. FIG. 9B illustrates the cipher text 906 of encrypted non-compliant data communicated from the local client computer 150 to the remote computer server 160, wherein the data is encrypted using a session key. FIG. 9C illustrates the plain text 908 of the non-compliant data which has been decrypted using the session key.

In some embodiments, the client public-private key pair 154 and the server public-private key pair 164 have a single-use expiry condition. The expiry condition may additionally include a predefined valid period such that the single-use must be performed during the predefined valid period. The client public-private key pair 154 and the server public-private key pair 164 automatically expires after the predefined valid period even if they have not been used. FIG. 9D illustrates the text string 910 of the single-use client private key 154-2 and the text string 912 of the single-use server public key 164-1. The single-use keys may be suitable for single-use situations such as when an embedded browser of the client application or a separate Internet browser retrieves a login page to perform various functions such as viewing and editing a client profile. The client uses the browser to execute the data communication instructions and encrypts/decrypts data using the relevant single-use keys. In one instance, the single-use server public key 164-1 is used by the local client computer 150 to encrypt authentication data to be sent to the remote computer server 160. The authentication data includes a username and/or password, or an instruction for changing the password. In another instance, the single-use client public key 154-1 is used by the remote computer server 160 to encrypt a profile page to be sent to the local client computer 150 and displayed on the browser.

Various embodiments described herein advantageously allow the user or client to perform secure data communication between the local client computer 150 and the remote computer server 160 by using the security keys 140, including the client public-private key pair 154 and the server public private key pair 164, which are generated by the remote computer server 160. This obviates the need for a third-party server to provide security keys which complicates the data communication process. The local client computer 150 can request the security keys 140 from the remote computer server 160 and initiate secure data communication with the remote computer server 160 whenever necessary. The data communication may be for storing new data or retrieving past data which are encrypted using the security keys 140.

In the example of medical/personal information, some data may be supposed to be confidential in all instances and only accessible by a group of clients, while some other data may only be accessed by selected clients. Accordingly, different classes of data may only be accessed by different selections of clients. By using the client-specific public key 154-1 to encrypt the data and the corresponding client-specific private key 154-2 to decrypt the encrypted data, different clients can access different classes of data. This advantageously allows only selected clients to access selected classes of data and for purposes such as to make certain changes to the medical/personal information while still keep within the relevant regulations/policies. This prevents fraudulent access to data which they are not allowed to, thus preventing alteration of sensitive medical/personal information which can result in false collective analysis of the medical/personal information.

Figure 10:
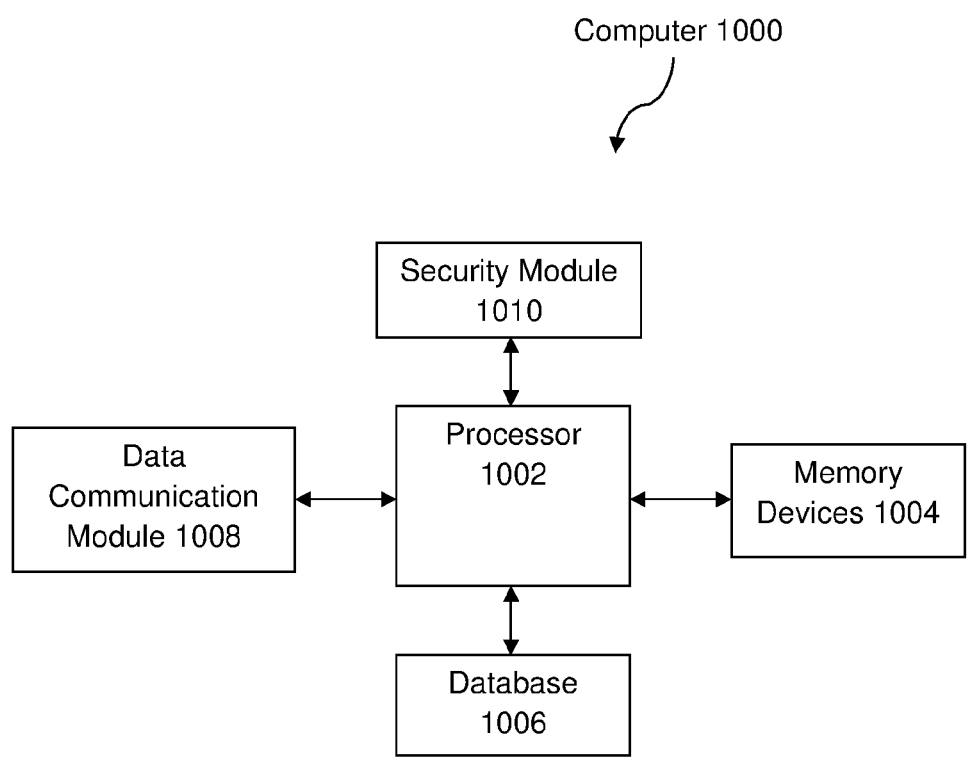
FIG. 10 is a block diagram illustration of the technical architecture of a computer.

FIG. 10 is a block diagram illustrating a technical architecture of a computer 1000 in accordance with embodiments of the present disclosure. Some non-limiting examples of the computer 1000 are the first computer 110, second computer 120, local client computer 150, and remote computer server 160. The computer 1000 includes a processor/central processing unit (CPU) 1002, memory devices 1004, a database 1006, a data communication module 1008, and a security module 1010.

The processor 1002 executes instructions, codes, computer programs, and/or scripts which it accesses from the memory devices 1004. The processor 1002 includes suitable logic, circuitry, and/or interfaces to execute such operations or steps. Some non-limiting examples of the processor 1002 include an application-specific integrated circuit (ASIC) processor, a reduced instruction set computing (RISC) processor, a complex instruction set computing (CISC) processor, a field-programmable gate array (FPGA), and the like. While only one processor 1002 is shown, multiple processors 1002 may be present. Thus, while instructions may be discussed as executed by a processor 1002, the instructions may be executed simultaneously, serially, or otherwise executed by one or multiple processors 1002 (e.g. in a multi-core configuration).

The memory devices 1004 may comprise storage devices (such as flash memory, disk drives, or memory cards), read-only memory (ROM), and random-access memory (RAM). The memory devices 1004 store non-transitory instructions operative by the processor 1002 to perform various operations or steps of the methods according to various embodiments of the present disclosure. The memory devices 1004 may be referred to as computer-readable storage media and/or non-transitory computer-readable media. Non-transitory computer-readable media include all computer-readable media, with the sole exception being a transitory propagating signal per se.

The database 1006 is any computer-operated hardware suitable for storing and/or retrieving data. Some non-limiting examples of the database 1006 are the databases 112, 122, 152, and 162. The database 1006 may include multiple storage units such as hard disks and/or solid-state disks in a Redundant Array of Independent Disks (RAID) configuration. The database 1006 may include, but is not limited to, a storage area network (SAN) and/or a network attached storage (NAS) system. The data communication module 1008 is configured for communication with other computers 1000. For example, the data communication module 1008 of the local client computer 150 may communicate or exchange data with the data communication module 1008 of the remote computer server 160.

The security module 1010 is configured to generate the security keys 140 according to various symmetric/asymmetric encryption algorithms described herein. Additionally, the security module 1010 is configured to perform encryption and decryption of data using the security keys 140. Some non-limiting examples of the security keys 140 are the session keys, first public-private key pair, second public-private key pair, client public-private key pair 154, and server public-private key pair 164. The security module 1010 generates session keys for encrypting data, and also generates the public-private key pairs via the token generation process 400/450.

In the foregoing detailed description, embodiments of the present disclosure in relation to a system and method for securing data communication between computers are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. A method for securing data communication between a first computer and a second computer, the method performed by the first and second computers and comprising:

cooperatively executing, by the first and second computers, a first data communication instruction for communicating first data from the first computer to the second computer;

generating a first session key by the first computer;

encrypting, by the first computer, the first data using the first session key;

encrypting, by the first computer, the first session key using a first public key, the first public key paired with a first private key, the first public-private key pair generated for the second computer by the first computer or second computer;

sending the encrypted first data and the encrypted first session key from the first computer to the second computer;

decrypting, by the second computer, the encrypted first session key using the first private key;

decrypting, by the second computer, the encrypted first data using the decrypted first session key; and processing, by the second computer, the decrypted first data based on the first data communication instruction, wherein the first public key or first private key is encrypted and decrypted using a token session key generated by the first computer, the token session key communicated from the first computer to the second computer;

wherein when the first public-private key pair is generated by the first computer, the first private key is encrypted by the first computer using the token session key and the encrypted first private key is communicated from first computer to the second computer, the encrypted first private key decrypted by the second computer using the token session key; and wherein when the first public-private key pair is generated by the second computer, the first public key is encrypted by the second computer using the token session key and the encrypted first public key is communicated from second computer to the first computer, the encrypted first public key decrypted by the first computer using the token session key.

2. The method according to claim 1, further comprising cooperatively performing, by the first and second computers, a token generation process before executing the first data communication instruction, the token generation process comprising:

generating the token session key by the first computer;

encrypting, by the first computer, a token request using the token session key;

sending the token session key and the encrypted token request from the first computer to the second computer;

decrypting, by the second computer, the encrypted token request using the token session key;

generating the first public-private key pair for and by the second computer;

encrypting, by the second computer, the first public key using the token session key;

sending the encrypted first public key from the second computer to the first computer; and decrypting, by the first computer, the encrypted first public key using the token session key.

3. The method according to claim 1, further comprising cooperatively performing, by the first and second computers, a token generation process before executing the first data communication instruction, the token generation process comprising:

generating the token session key by the first computer;

generating the first public-private key pair by the first computer for the second computer;

encrypting, by the first computer, the first private key using the token session key;

sending the token session key and the encrypted first private key from the first computer to the second computer; and decrypting, by the second computer, the encrypted first private key using the token session key.

4. The method according to claim 1, wherein the first public-private key pair has an expiry condition, such that the first public-private key pair is valid for encryption and decryption before the expiry condition is met.

5. The method according to claim 1, wherein the first computer is a local client computer and the second computer is a remote computer server.

6. The method according to claim 1, wherein the first computer is a remote computer server and the second computer is a local client computer.

7. The method according to claim 1, further comprising:

cooperatively executing, by the first and second computers, a second data communication instruction for communicating second data from the second computer to the first computer;

generating a second session key by the second computer;

encrypting, by the second computer, the second data using the second session key;

encrypting, by the second computer, the second session key using a second public key, the second public key paired with a second private key, the second public-private key pair generated for the first computer by the first computer or second computer;

sending the encrypted second data and the encrypted second session key from the second computer to the first computer;

decrypting, by the first computer, the encrypted second session key using the second private key;

decrypting, by the first computer, the encrypted second data using the decrypted second session key; and processing, by the first computer, the decrypted second data based on the second data communication instruction, wherein the second public key or second private key is encrypted and decrypted using a token session key generated by the first computer, the token session key communicated from the first computer to the second computer;

wherein when the second public-private key pair is generated by the first computer, the second public key is encrypted by the first computer using the token session key and the encrypted second public key is communicated from first computer to the second computer, the encrypted second public key decrypted by the second computer using the token session key; and wherein when the second public-private key pair is generated by the second computer, the second private key is encrypted by the second computer using the token session key and the encrypted second private key is communicated from second computer to the first computer, the encrypted second private key decrypted by the first computer using the token session key.

8. The method according to claim 7, further comprising cooperatively performing, by the first and second computers, a token generation process before executing the first data communication instruction, the token generation process comprising:

generating the token session key by the first computer;

encrypting, by the first computer, a token request using the token session key;

sending the token session key and the encrypted token request from the first computer to the second computer;

decrypting, by the second computer, the encrypted token request using the token session key;

generating the first public-private key pair for and by the second computer;

generating the second public-private key pair by the second computer for the first computer;

encrypting, by the second computer, the first public key and the second private key using the token session key;

sending the encrypted first public key and the encrypted second private key from the second computer to the first computer; and decrypting, by the first computer, the encrypted first public key and the encrypted second private key using the token session key.

9. The method according to claim 7, further comprising cooperatively performing, by the first and second computers, a token generation process before executing the first data communication instruction, the token generation process comprising:

generating the token session key by the first computer;

generating the first public-private key pair by the first computer for the second computer;

generating the second public-private key pair for and by the first computer;

encrypting, by the first computer, the first private key and the second public key using the token session key;

sending the token session key, the encrypted first private key, and the encrypted second public key from the first computer to the second computer; and decrypting, by the second computer, the encrypted first private key and the encrypted second public key using the token session key.

10. The method according to claim 7, wherein each of the first and second public-private key pairs has an expiry condition, such that each of the first and second public-private key pairs is valid for encryption and decryption before the respective expiry condition is met.

11. The method according to claim 7, wherein the first computer is a local client computer and the second computer is a remote computer server, wherein the first data comprises authentication data of a user of the local client computer, and wherein the second data comprises a message authentication code (MAC) generated by the remote computer server in response to successful authentication of the authentication data by the remote computer server.

12. A computer system comprising a first computer and a second computer communicatively connected to each other, the computer system configured for securing data communication between the first and second computers, the first and second computers configured for performing steps comprising:

cooperatively executing, by the first and second computers, a first data communication instruction for communicating first data from the first computer to the second computer;

generating a first session key by the first computer;

encrypting, by the first computer, the first data using the first session key;

encrypting, by the first computer, the first session key using a first public key, the first public key paired with a first private key, the first public-private key pair generated for the second computer by the first computer or second computer;

sending the encrypted first data and the encrypted first session key from the first computer to the second computer;

decrypting, by the second computer, the encrypted first session key using the first private key;

decrypting, by the second computer, the encrypted first data using the decrypted first session key; and processing, by the second computer, the decrypted first data based on the first data communication instruction, wherein the first public key or first private key is encrypted and decrypted using a token session key generated by the first computer, the token session key communicated from the first computer to the second computer;

wherein when the first public-private key pair is generated by the first computer, the first private key is encrypted by the first computer using the token session key and the encrypted first private key is communicated from first computer to the second computer, the encrypted first private key decrypted by the second computer using the token session key; and wherein when the first public-private key pair is generated by the second computer, the first public key is encrypted by the second computer using the token session key and the encrypted first public key is communicated from second computer to the first computer, the encrypted first public key decrypted by the first computer using the token session key.

13. The system according to claim 12, further comprising cooperatively performing, by the first and second computers, a token generation process before executing the first data communication instruction, the token generation process comprising:

generating the token session key by the first computer;

encrypting, by the first computer, a token request using the token session key;

sending the token session key and the encrypted token request from the first computer to the second computer;

decrypting, by the second computer, the encrypted token request using the token session key;

generating the first public-private key pair for and by the second computer;

encrypting, by the second computer, the first public key using the token session key;

sending the encrypted first public key from the second computer to the first computer; and decrypting, by the first computer, the encrypted first public key using the token session key.

14. The system according to claim 12, further comprising cooperatively performing, by the first and second computers, a token generation process before executing the first data communication instruction, the token generation process comprising:

generating the token session key by the first computer;

generating the first public-private key pair by the first computer for the second computer;

encrypting, by the first computer, the first private key using the token session key;

sending the token session key and the encrypted first private key from the first computer to the second computer; and decrypting, by the second computer, the encrypted first private key using the token session key.

15. The system according to claim 12, wherein the first computer is a local client computer and the second computer is a remote computer server.

16. The system according to claim 12, wherein the first computer is a remote computer server and the second computer is a local client computer.

17. The system according to claim 12, the steps further comprising:
cooperatively executing, by the first and second computers, a second data communication instruction for communicating second data from the second computer to the first computer;
generating a second session key by the second computer;
encrypting, by the second computer, the second data using the second session key;
encrypting, by the second computer, the second session key using a second public key, the second public key paired with a second private key, the second public-private key pair generated for the first computer by the first computer or second computer;
sending the encrypted second data and the encrypted second session key from the second computer to the first computer;
decrypting, by the first computer, the encrypted second session key using the second private key;
decrypting, by the first computer, the encrypted second data using the decrypted second session key; and
processing, by the first computer, the decrypted second data based on the second data communication instruction,
wherein the second public key or second private key is encrypted and decrypted using a token session key generated by the first computer, the token session key communicated from the first computer to the second computer;
wherein when the second public-private key pair is generated by the first computer, the second public key is encrypted by the first computer using the token session key and the encrypted second public key is communicated from first computer to the second computer, the encrypted second public key decrypted by the second computer using the token session key; and
wherein when the second public-private key pair is generated by the second computer, the second private key is encrypted by the second computer using the token session key and the encrypted second private key is communicated from second computer to the first computer, the encrypted second private key decrypted by the first computer using the token session key.

18. The system according to claim 17, further comprising cooperatively performing, by the first and second computers, a token generation process before executing the first data communication instruction, the token generation process comprising:
generating the token session key by the first computer;
encrypting, by the first computer, a token request using the token session key;
sending the token session key and the encrypted token request from the first computer to the second computer;
decrypting, by the second computer, the encrypted token request using the token session key;
generating the first public-private key pair for and by the second computer;
generating the second public-private key pair by the second computer for the first computer;
encrypting, by the second computer, the first public key and the second private key using the token session key;
sending the encrypted first public key and the encrypted second private key from the second computer to the first computer; and
decrypting, by the first computer, the encrypted first public key and the encrypted second private key using the token session key.

19. The system according to claim 17, further comprising cooperatively performing, by the first and second computers, a token generation process before executing the first data communication instruction, the token generation process comprising:
generating the token session key by the first computer;
generating the first public-private key pair by the first computer for the second computer;
generating the second public-private key pair for and by the first computer;
encrypting, by the first computer, the first private key and the second public key using the token session key;
sending the token session key, the encrypted first private key, and the encrypted second public key from the first computer to the second computer; and
decrypting, by the second computer, the encrypted first private key and the encrypted second public key using the token session key.

20. The system according to claim 17, wherein the first computer is a local client computer and the second computer is a remote computer server, wherein the first data communication instruction relates to storing of the first data on the remote computer server, and wherein the second data communication instruction relates to retrieving of the second data from the remote computer server.

* * * * *